(12) United States Patent
Gowans et al.

(10) Patent No.: US 12,447,259 B2
(45) Date of Patent: Oct. 21, 2025

(54) SENSOR INTEGRATED DRESSINGS AND SYSTEMS

(71) Applicant: Smith & Nephew PLC, Watford (GB)

(72) Inventors: Philip Gowans, Doncaster (GB); Edward Yerbury Hartwell, Hull (GB); Allan Kenneth Frazer Grugeon Hunt, Beverley (GB); Lee Ian Partington, Hessle (GB); Marcus Damian Phillips, Wakefield (GB); Felix Clarence Quintanar, Hull (GB); Daniel Lee Steward, Kingston upon Hull (GB); Charlotte Rose Urwin, Hull (GB); Amy Nicole Wheldrake, Goole (GB)

(73) Assignee: Smith & Nephew PLC, Watford (GB)

( * ) Notice: Subject to any disclaimer, the term of this patent is extended or adjusted under 35 U.S.C. 154(b) by 683 days.

(21) Appl. No.: 17/427,063

(22) PCT Filed: Jan. 29, 2020

(86) PCT No.: PCT/EP2020/052111
§ 371 (c)(1),
(2) Date: Jul. 29, 2021

(87) PCT Pub. No.: WO2020/157103
PCT Pub. Date: Aug. 6, 2020

(65) Prior Publication Data
US 2022/0143297 A1 May 12, 2022

(30) Foreign Application Priority Data

Jan. 30, 2019 (GB) ...................................... 1901264
Apr. 24, 2019 (GB) ...................................... 1905696

(51) Int. Cl.
*A61F 13/00* (2024.01)
*A61F 13/01* (2024.01)
(Continued)

(52) U.S. Cl.
CPC ......... *A61M 1/95* (2021.05); *A61F 13/00051* (2013.01); *A61F 13/00991* (2013.01);
(Continued)

(58) Field of Classification Search
CPC ................ A61M 1/95; A61M 2207/00; A61M 2205/0238; A61F 13/01017; A61F 13/00051; A61F 13/00991; A61F 13/0206
(Continued)

(56) References Cited

U.S. PATENT DOCUMENTS 3,896,802 A    7/1975   Williams
4,023,208 A *   5/1977   Feit ...................... G11B 5/3103
                                                                 360/122
(Continued)

FOREIGN PATENT DOCUMENTS

CA         3059516 A1 * 10/2018 ....... A61F 13/00055
CN         105232229 A     1/2016
(Continued)

OTHER PUBLICATIONS

EP-2532305-A1 translated (Year: 2012).*
(Continued)

*Primary Examiner* — Alireza Nia
*Assistant Examiner* — Michael Milo
(74) *Attorney, Agent, or Firm* — Knobbe, Martens, Olson & Bear, LLP

(57) ABSTRACT

In some cases, a wound dressing includes a substantially flexible substrate with a first, wound-facing side supporting a plurality of electronic components and a second side opposite the first side, a wicking layer in contact with the second side of the substrate, the wicking layer configured to facilitate passage of fluid, a substantially non-stretchable coating applied to at least some of the plurality of electronic components, a substantially stretchable coating applied to
(Continued)

the first side of the substrate, the stretchable coating applied over the substantially non-stretchable coating, a wound contact layer in contact with the stretchable coating, the wound contact layer configured to adhere to a wound, and a protective layer applied to the wound contact layer, the protective layer configured to be removed to expose the wound contact layer. In some cases, a method of manufacturing the wound dressing.

13 Claims, 15 Drawing Sheets

(51) Int. Cl.
*A61M 1/00* (2006.01)
*A61F 13/0206* (2024.01)

(52) U.S. Cl.
CPC .... *A61F 13/01017* (2024.01); *A61F 13/0206* (2013.01); *A61M 2205/0238* (2013.01); *A61M 2207/00* (2013.01)

(58) Field of Classification Search
USPC .......................................................... 602/46
See application file for complete search history.

(56) References Cited

U.S. PATENT DOCUMENTS

| | | | |
|---|---|---|---|
| 4,334,530 A | 6/1982 | Hassell | |
| 5,090,410 A | 2/1992 | Saper et al. | |
| 5,253,654 A | 10/1993 | Thomas et al. | |
| 5,635,201 A | 6/1997 | Fabo | |
| 5,642,096 A | 6/1997 | Leyerer et al. | |
| 5,678,448 A | 10/1997 | Fullen et al. | |
| 5,690,610 A | 11/1997 | Ito et al. | |
| 5,836,990 A | 11/1998 | Li | |
| 6,095,992 A | 8/2000 | Augustine | |
| 6,178,342 B1 | 1/2001 | Borgos et al. | |
| 6,381,482 B1 | 4/2002 | Jayaraman et al. | |
| 6,517,484 B1 | 2/2003 | Wilk et al. | |
| 6,551,252 B2 | 4/2003 | Sackner et al. | |
| 6,731,987 B1 | 5/2004 | McAdams et al. | |
| 7,077,832 B2 | 7/2006 | Fleischmann | |
| 7,088,591 B2 | 8/2006 | Kishimoto et al. | |
| 7,201,063 B2 | 4/2007 | Taylor | |
| 7,206,623 B2 | 4/2007 | Blank et al. | |
| 7,289,205 B2 | 10/2007 | Yaroslavsky et al. | |
| 7,316,652 B2 | 1/2008 | Dalgaard et al. | |
| 7,429,255 B2 | 9/2008 | Thompson | |
| 7,520,875 B2 | 4/2009 | Bernabei | |
| 7,521,292 B2 | 4/2009 | Rogers et al. | |
| 7,569,742 B2 | 8/2009 | Haggstrom et al. | |
| 7,625,117 B2 | 12/2009 | Haslett et al. | |
| 7,687,678 B2 | 3/2010 | Jacobs | |
| 7,846,141 B2 | 12/2010 | Weston | |
| 7,877,866 B1 | 2/2011 | Greenberg et al. | |
| 7,884,258 B2 | 2/2011 | Boehringer et al. | |
| 7,904,133 B2 | 3/2011 | Gehman et al. | |
| 7,922,676 B2 | 4/2011 | Daskal et al. | |
| 7,942,869 B2 | 5/2011 | Houbolt et al. | |
| 7,945,302 B2 | 5/2011 | McAdams | |
| 8,019,401 B1 | 9/2011 | Smith et al. | |
| 8,032,210 B2 | 10/2011 | Finneran et al. | |
| 8,060,174 B2 | 11/2011 | Simpson et al. | |
| 8,079,247 B2 | 12/2011 | Russell et al. | |
| 8,111,165 B2 | 2/2012 | Ortega et al. | |
| 8,116,841 B2 | 2/2012 | Bly et al. | |
| 8,182,425 B2 | 5/2012 | Stamatas et al. | |
| 8,238,996 B2 | 8/2012 | Burnes et al. | |
| 8,241,231 B2 | 8/2012 | Bausewein et al. | |
| 8,332,053 B1 | 12/2012 | Patterson et al. | |
| 8,333,874 B2 | 12/2012 | Currie | |
| 8,366,692 B2 | 2/2013 | Weston et al. | |
| 8,480,641 B2 | 7/2013 | Jacobs | |
| 8,579,872 B2 | 11/2013 | Coulthard et al. | |
| 8,644,911 B1 | 2/2014 | Panasyuk et al. | |
| 8,663,106 B2 | 3/2014 | Stivoric et al. | |
| 8,682,442 B2 | 3/2014 | McAdams | |
| 8,783,948 B2 | 7/2014 | Panda et al. | |
| 8,788,009 B2 | 7/2014 | Greene et al. | |
| 8,800,386 B2 | 8/2014 | Taylor | |
| 8,818,478 B2 | 8/2014 | Scheffler et al. | |
| 8,848,187 B2 | 9/2014 | Uematsu et al. | |
| 8,894,590 B2 | 11/2014 | Lamoise et al. | |
| 8,925,392 B2 | 1/2015 | Esposito et al. | |
| 8,934,957 B2 | 1/2015 | Dias et al. | |
| 8,934,965 B2 | 1/2015 | Rogers et al. | |
| 8,943,897 B2 | 2/2015 | Beauvais et al. | |
| 8,948,839 B1 | 2/2015 | Longinotti-Buitoni et al. | |
| 8,997,588 B2 | 4/2015 | Taylor | |
| 9,000,251 B2 | 4/2015 | Murphy et al. | |
| 9,042,075 B2 | 5/2015 | Borini et al. | |
| 9,192,531 B2 | 11/2015 | Wu | |
| 9,220,455 B2 | 12/2015 | Sarrafzadeh et al. | |
| 9,226,402 B2 | 12/2015 | Hsu | |
| 9,282,897 B2 | 3/2016 | Ross, Jr. et al. | |
| 9,314,175 B2 | 4/2016 | Jacofsky et al. | |
| 9,320,473 B2 | 4/2016 | Shuler | |
| 9,372,123 B2 | 6/2016 | Li et al. | |
| 9,378,450 B1 | 6/2016 | Mei et al. | |
| 9,386,947 B2 | 7/2016 | Johnson | |
| 9,393,354 B2 | 7/2016 | Freedman et al. | |
| 9,402,988 B2 | 8/2016 | Buchanan et al. | |
| 9,408,573 B2 | 8/2016 | Welch et al. | |
| 9,427,179 B2 | 8/2016 | Mestrovic et al. | |
| 9,439,599 B2 | 9/2016 | Thompson et al. | |
| 9,483,726 B2 | 11/2016 | Mei et al. | |
| 9,494,474 B2 | 11/2016 | Servati et al. | |
| 9,511,215 B2 | 12/2016 | Skiba | |
| 9,516,758 B2 | 12/2016 | Arora et al. | |
| 9,526,439 B2 | 12/2016 | Connelly et al. | |
| 9,554,484 B2 | 1/2017 | Rogers et al. | |
| 9,572,507 B2 | 2/2017 | Moore et al. | |
| 9,582,072 B2 | 2/2017 | Connor | |
| 9,585,620 B2 | 3/2017 | Paquet et al. | |
| 9,587,991 B2 | 3/2017 | Padiy | |
| 9,592,007 B2 | 3/2017 | Nuovo et al. | |
| 9,603,560 B2 | 3/2017 | Monty et al. | |
| 9,610,388 B2 | 4/2017 | Aceto et al. | |
| 9,613,911 B2 | 4/2017 | Rogers et al. | |
| 9,629,584 B2 | 4/2017 | Macia Barber et al. | |
| 9,675,238 B2 | 6/2017 | Iida et al. | |
| 9,687,195 B2 | 6/2017 | Sims et al. | |
| 9,717,565 B2 | 8/2017 | Blair | |
| 9,829,471 B2 | 11/2017 | Hammond et al. | |
| 9,907,103 B2 | 2/2018 | Chen et al. | |
| 10,004,643 B2 | 6/2018 | Luckemeyer et al. | |
| 10,046,096 B2 | 8/2018 | Askem et al. | |
| 10,080,524 B1 | 9/2018 | Xi | |
| 10,086,117 B2 | 10/2018 | Locke et al. | |
| 10,117,705 B2 | 11/2018 | Chernov et al. | |
| 10,152,789 B2 | 12/2018 | Carnes et al. | |
| 10,182,740 B2 | 1/2019 | Tonar et al. | |
| 10,182,750 B1* | 1/2019 | Philippine | A61B 5/6801 |
| 10,207,031 B2 | 2/2019 | Toth | |
| 10,209,213 B2 | 2/2019 | Kang et al. | |
| 10,285,620 B2 | 5/2019 | Jung et al. | |
| 10,321,862 B2 | 6/2019 | Dalene et al. | |
| 10,463,773 B2 | 11/2019 | Haggstrom et al. | |
| 10,687,984 B2 | 6/2020 | Rovaniemi | |
| 10,695,227 B2 | 6/2020 | Locke et al. | |
| 10,857,038 B2 | 12/2020 | Zamierowski et al. | |
| 11,026,847 B2 | 6/2021 | Piotrowski et al. | |
| 11,229,553 B2 | 1/2022 | Chen et al. | |
| 11,647,922 B2 | 5/2023 | Scherer | |
| 11,850,121 B2 | 12/2023 | Rapp | |
| 2002/0016536 A1 | 2/2002 | Benni | |
| 2002/0135752 A1 | 9/2002 | Sokolov et al. | |
| 2003/0033032 A1 | 2/2003 | Lind et al. | |
| 2003/0208148 A1 | 11/2003 | Sullivan | |
| 2003/0210810 A1 | 11/2003 | Gee, Jr. et al. | |
| 2003/0216630 A1 | 11/2003 | Jersey-Willuhn et al. | |
| 2004/0230132 A1 | 11/2004 | Shehada | |

(56) References Cited

U.S. PATENT DOCUMENTS

| | | |
|---|---|---|
| 2005/0088832 A1 | 4/2005 | Su et al. |
| 2005/0240107 A1 | 10/2005 | Alfano et al. |
| 2005/0280531 A1 | 12/2005 | Fadem et al. |
| 2006/0052678 A1 | 3/2006 | Drinan et al. |
| 2006/0058690 A1 | 3/2006 | Bartnik et al. |
| 2006/0181791 A1 | 8/2006 | Van Beek et al. |
| 2006/0234383 A1 | 10/2006 | Gough |
| 2006/0241495 A1 | 10/2006 | Kurtz |
| 2007/0055209 A1 | 3/2007 | Patel et al. |
| 2007/0173892 A1 | 7/2007 | Fleischer et al. |
| 2007/0191754 A1 | 8/2007 | Aali |
| 2007/0260421 A1 | 11/2007 | Berner, Jr. et al. |
| 2007/0293748 A1 | 12/2007 | Engvall et al. |
| 2008/0081973 A1 | 4/2008 | Hoarau |
| 2008/0167535 A1 | 7/2008 | Stivoric et al. |
| 2008/0258717 A1 | 10/2008 | Igney et al. |
| 2008/0287747 A1 | 11/2008 | Mestrovic et al. |
| 2008/0319282 A1 | 12/2008 | Tran |
| 2008/0319283 A1 | 12/2008 | Cotton et al. |
| 2009/0149800 A1 | 6/2009 | Durand |
| 2009/0177051 A1 | 7/2009 | Arons et al. |
| 2009/0177110 A1 | 7/2009 | Lyden et al. |
| 2009/0209830 A1 | 8/2009 | Nagle et al. |
| 2009/0209896 A1 | 8/2009 | Selevan |
| 2009/0234206 A1 | 9/2009 | Gaspard et al. |
| 2009/0245601 A1 | 10/2009 | Cohen et al. |
| 2010/0022990 A1 | 1/2010 | Karpowicz et al. |
| 2010/0025831 A1 | 2/2010 | Yamazaki et al. |
| 2010/0030132 A1* | 2/2010 | Niezgoda ............... A61M 1/73 604/289 |
| 2010/0166252 A1 | 7/2010 | Ahmed et al. |
| 2010/0168727 A1 | 7/2010 | Hancock et al. |
| 2010/0305473 A1 | 12/2010 | Yuzhakov |
| 2011/0004088 A1 | 1/2011 | Grossman |
| 2011/0015591 A1 | 1/2011 | Hanson et al. |
| 2011/0054283 A1 | 3/2011 | Shuler |
| 2011/0130697 A1 | 6/2011 | Nagle et al. |
| 2011/0140703 A1 | 6/2011 | Chiao et al. |
| 2011/0190639 A1 | 8/2011 | Peltie et al. |
| 2011/0218757 A1 | 9/2011 | Callsen et al. |
| 2011/0242532 A1 | 10/2011 | McKenna |
| 2011/0245682 A1 | 10/2011 | Robinson et al. |
| 2011/0301441 A1 | 12/2011 | Bandic et al. |
| 2012/0029306 A1 | 2/2012 | Paquet et al. |
| 2012/0029307 A1 | 2/2012 | Paquet et al. |
| 2012/0029410 A1 | 2/2012 | Koenig et al. |
| 2012/0112347 A1 | 5/2012 | Eckhardt et al. |
| 2012/0165717 A1 | 6/2012 | Al Khaburi |
| 2012/0190956 A1 | 7/2012 | Connolly |
| 2012/0190989 A1 | 7/2012 | Kaiser et al. |
| 2012/0265120 A1 | 10/2012 | Beisang, III et al. |
| 2012/0271265 A1 | 10/2012 | Langdon |
| 2012/0277559 A1 | 11/2012 | Kohl-Bareis et al. |
| 2012/0316538 A1 | 12/2012 | Heiser et al. |
| 2012/0330252 A1 | 12/2012 | Stokes et al. |
| 2013/0041235 A1 | 2/2013 | Rogers et al. |
| 2013/0064772 A1 | 3/2013 | Swiss et al. |
| 2013/0121544 A1 | 5/2013 | Sarrafzadeh et al. |
| 2013/0123722 A1 | 5/2013 | Pratt et al. |
| 2013/0151223 A1 | 6/2013 | Zamierowski et al. |
| 2013/0200268 A1 | 8/2013 | Rafferty et al. |
| 2013/0261409 A1 | 10/2013 | Pathak et al. |
| 2013/0271278 A1 | 10/2013 | Duesterhoft et al. |
| 2013/0274563 A1 | 10/2013 | Duesterhoft et al. |
| 2013/0274629 A1 | 10/2013 | Duesterhoft et al. |
| 2013/0317367 A1 | 11/2013 | Shuler |
| 2014/0012108 A1 | 1/2014 | McPeak |
| 2014/0018637 A1 | 1/2014 | Bennett et al. |
| 2014/0024905 A1 | 1/2014 | Sarrafzadeh et al. |
| 2014/0031663 A1 | 1/2014 | Gallego et al. |
| 2014/0072190 A1 | 3/2014 | Wu et al. |
| 2014/0075658 A1 | 3/2014 | McGuin |
| 2014/0107495 A1 | 4/2014 | Marinelli et al. |
| 2014/0107498 A1 | 4/2014 | Bower et al. |
| 2014/0147611 A1 | 5/2014 | Ackerman, Jr. |
| 2014/0203797 A1 | 7/2014 | Stivoric et al. |
| 2014/0206947 A1 | 7/2014 | Isserow et al. |
| 2014/0232516 A1 | 8/2014 | Stivoric et al. |
| 2014/0235166 A1 | 8/2014 | Molettiere et al. |
| 2014/0243709 A1 | 8/2014 | Gibson et al. |
| 2014/0296749 A1 | 10/2014 | Reid, Jr. et al. |
| 2014/0298927 A1 | 10/2014 | Allin et al. |
| 2014/0298928 A1 | 10/2014 | Duesterhoft et al. |
| 2014/0303463 A1 | 10/2014 | Robinson et al. |
| 2014/0324120 A1 | 10/2014 | Bogie et al. |
| 2014/0340857 A1 | 11/2014 | Hsu et al. |
| 2014/0343478 A1 | 11/2014 | Brennan et al. |
| 2014/0350882 A1 | 11/2014 | Everett et al. |
| 2015/0018792 A1 | 1/2015 | Marsiquet et al. |
| 2015/0025343 A1 | 1/2015 | Gareau et al. |
| 2015/0138330 A1 | 5/2015 | Krishnamoorthi |
| 2015/0141767 A1 | 5/2015 | Rogers et al. |
| 2015/0148760 A1 | 5/2015 | Dodd et al. |
| 2015/0150479 A1 | 6/2015 | Yoshino et al. |
| 2015/0182166 A1 | 7/2015 | Evans et al. |
| 2015/0223716 A1 | 8/2015 | Korkala et al. |
| 2015/0257644 A1 | 9/2015 | Cao |
| 2015/0265191 A1 | 9/2015 | Harding et al. |
| 2015/0292968 A1 | 10/2015 | Vogt et al. |
| 2015/0313476 A1 | 11/2015 | Pisani et al. |
| 2015/0313533 A1 | 11/2015 | Rapp et al. |
| 2015/0327777 A1 | 11/2015 | Kostic et al. |
| 2015/0335254 A1 | 11/2015 | Fastert et al. |
| 2015/0335287 A1 | 11/2015 | Neuman et al. |
| 2015/0335288 A1 | 11/2015 | Toth et al. |
| 2015/0351970 A1 | 12/2015 | Dagger et al. |
| 2015/0359485 A1 | 12/2015 | Berg et al. |
| 2015/0374309 A1 | 12/2015 | Farkas et al. |
| 2016/0015962 A1 | 1/2016 | Shokoueinejad Maragheh et al. |
| 2016/0022223 A1 | 1/2016 | Grundfest et al. |
| 2016/0029900 A1 | 2/2016 | LaPlante et al. |
| 2016/0030132 A1 | 2/2016 | Cheung et al. |
| 2016/0038045 A1 | 2/2016 | Shapiro |
| 2016/0038083 A1 | 2/2016 | Ding et al. |
| 2016/0051147 A1 | 2/2016 | Cohen et al. |
| 2016/0058380 A1 | 3/2016 | Lee et al. |
| 2016/0066854 A1 | 3/2016 | Mei et al. |
| 2016/0069743 A1 | 3/2016 | McQuilkin et al. |
| 2016/0074234 A1 | 3/2016 | Abichandani et al. |
| 2016/0081580 A1 | 3/2016 | Bergelin et al. |
| 2016/0081601 A1 | 3/2016 | Ballam et al. |
| 2016/0100790 A1 | 4/2016 | Cantu et al. |
| 2016/0100987 A1 | 4/2016 | Hartwell et al. |
| 2016/0101282 A1 | 4/2016 | Bergelin et al. |
| 2016/0129469 A1 | 5/2016 | Kulinsky et al. |
| 2016/0143534 A1 | 5/2016 | Hyde et al. |
| 2016/0144084 A1* | 5/2016 | Collinson ............... A61F 13/05 604/319 |
| 2016/0157779 A1 | 6/2016 | Baxi et al. |
| 2016/0165719 A1 | 6/2016 | Li et al. |
| 2016/0213269 A1 | 7/2016 | Lam et al. |
| 2016/0228049 A1 | 8/2016 | Nackaerts et al. |
| 2016/0232807 A1 | 8/2016 | Ghaffari et al. |
| 2016/0242331 A1 | 8/2016 | Park et al. |
| 2016/0249810 A1 | 9/2016 | Darty et al. |
| 2016/0262672 A1 | 9/2016 | Hammond et al. |
| 2016/0262687 A1 | 9/2016 | Vaidyanathan et al. |
| 2016/0270700 A1 | 9/2016 | Baxi et al. |
| 2016/0287177 A1 | 10/2016 | Huppert et al. |
| 2016/0302729 A1 | 10/2016 | Starr et al. |
| 2016/0310023 A1 | 10/2016 | Chachisvilis et al. |
| 2016/0317057 A1 | 11/2016 | Li et al. |
| 2016/0331263 A1 | 11/2016 | Cailler et al. |
| 2016/0331322 A1 | 11/2016 | Son et al. |
| 2016/0338591 A1 | 11/2016 | Lachenbruch et al. |
| 2016/0354001 A1 | 12/2016 | Buckley et al. |
| 2016/0367189 A1 | 12/2016 | Aimone et al. |
| 2016/0367192 A1 | 12/2016 | Iyengar et al. |
| 2016/0367406 A1 | 12/2016 | Barnett |
| 2017/0000407 A1 | 1/2017 | Saxby et al. |
| 2017/0007853 A1 | 1/2017 | Alford et al. |
| 2017/0027498 A1 | 2/2017 | Larson et al. |
| 2017/0079740 A1 | 3/2017 | Hufnagel et al. |
| 2017/0086519 A1 | 3/2017 | Vigano' et al. |

(56) References Cited

U.S. PATENT DOCUMENTS

| | | | |
|---|---|---|---|
| 2017/0086709 A1 | 3/2017 | Khine et al. |
| 2017/0095208 A1 | 4/2017 | Oberleitner et al. |
| 2017/0146474 A1 | 5/2017 | Bedell et al. |
| 2017/0156594 A1 | 6/2017 | Stivoric et al. |
| 2017/0156621 A1 | 6/2017 | Bettinger et al. |
| 2017/0156658 A1 | 6/2017 | Maharbiz et al. |
| 2017/0164865 A1 | 6/2017 | Rafferty et al. |
| 2017/0164876 A1 | 6/2017 | Hyde et al. |
| 2017/0172439 A1 | 6/2017 | Zhu et al. |
| 2017/0202711 A1 | 7/2017 | Cernasov et al. |
| 2017/0224271 A1 | 8/2017 | Lachenbruch et al. |
| 2017/0231015 A1 | 8/2017 | Jang et al. |
| 2017/0258972 A1 | 9/2017 | Weston |
| 2017/0319075 A1 | 11/2017 | Homan et al. |
| 2017/0326004 A1 | 11/2017 | Long et al. |
| 2017/0367644 A1 | 12/2017 | Sharman et al. |
| 2018/0008177 A1 | 1/2018 | Shimuta et al. |
| 2018/0055359 A1 | 3/2018 | Shamim et al. |
| 2018/0055697 A1 | 3/2018 | Mihali et al. |
| 2018/0056087 A1 | 3/2018 | Ribeiro et al. |
| 2018/0070880 A1 | 3/2018 | Trembly et al. |
| 2018/0074547 A1 | 3/2018 | Smadi et al. |
| 2018/0116877 A1 | 5/2018 | Ineichen |
| 2018/0132287 A1 | 5/2018 | Cheng et al. |
| 2018/0192514 A1 | 7/2018 | Seo |
| 2018/0200414 A1 | 7/2018 | Askem et al. |
| 2018/0206758 A1 | 7/2018 | Feldkamp et al. |
| 2018/0235484 A1 | 8/2018 | Mozdzierz |
| 2018/0296397 A1 | 10/2018 | Askem et al. |
| 2019/0021911 A1 | 1/2019 | Askem et al. |
| 2019/0060126 A1 | 2/2019 | Ribble et al. |
| 2019/0076298 A1 | 3/2019 | Quintanar et al. |
| 2019/0083025 A1 | 3/2019 | Aung et al. |
| 2019/0133812 A1 | 5/2019 | Seres et al. |
| 2019/0159938 A1 | 5/2019 | Askem et al. |
| 2019/0175098 A1 | 6/2019 | Burns |
| 2019/0192066 A1 | 6/2019 | Schoess et al. |
| 2019/0231939 A1 | 8/2019 | Askem et al. |
| 2019/0290496 A1 | 9/2019 | Brownhill et al. |
| 2019/0328217 A1 * | 10/2019 | Moreau ............... A61B 1/00094 |
| 2019/0374387 A1 | 12/2019 | Ribble et al. |
| 2020/0054218 A1 | 2/2020 | Xi |
| 2020/0078482 A1 | 3/2020 | Yoon et al. |
| 2020/0078499 A1 | 3/2020 | Gadde et al. |
| 2020/0100711 A1 | 4/2020 | Choudhury et al. |
| 2020/0147407 A1 | 5/2020 | Efremkin |
| 2020/0281512 A1 | 9/2020 | Grubb et al. |
| 2020/0281513 A1 | 9/2020 | Grubb et al. |
| 2020/0281529 A1 | 9/2020 | Grubb et al. |
| 2020/0289346 A1 | 9/2020 | Hansen et al. |
| 2020/0330258 A1 | 10/2020 | Hansen et al. |
| 2020/0360547 A1 | 11/2020 | Smith et al. |
| 2021/0128364 A1 * | 5/2021 | Cole .................... A61F 13/0289 |
| 2021/0137446 A1 | 5/2021 | Brownhill et al. |
| 2021/0212855 A1 | 7/2021 | Hansen et al. |

FOREIGN PATENT DOCUMENTS

| | | | |
|---|---|---|---|
| CN | 105395184 A | 3/2016 | |
| CN | 106102322 A | 11/2016 | |
| CN | 109350362 A | 2/2019 | |
| DE | 102012211015 A1 | 1/2014 | |
| DE | 102013013013 A1 | 2/2015 | |
| DE | 102018202433 A1 * | 8/2018 | ........... H05K 1/0216 |
| EP | 2454990 A2 | 5/2012 | |
| EP | 2532305 A1 * | 12/2012 | ........... A61B 5/0015 |
| EP | 2565630 A1 | 3/2013 | |
| EP | 3231478 A1 | 10/2017 | |
| EP | 3409190 A1 | 12/2018 | |
| EP | 3499510 A1 | 6/2019 | |
| EP | 3837520 A1 | 6/2021 | |
| GB | 1476894 A | 6/1977 | |
| GB | 2316171 A | 2/1998 | |
| GB | 2563602 A | 12/2018 | |
| JP | 2009225863 A | 10/2009 | |
| JP | 2016083576 A | 5/2016 | |
| JP | 2017083200 A | 5/2017 | |
| KR | 20120119523 A | 10/2012 | |
| KR | 101224629 B1 | 1/2013 | |
| KR | 20140024743 A | 3/2014 | |
| KR | 20140058041 A | 5/2014 | |
| KR | 20160071044 A | 6/2016 | |
| KR | 20190105898 A | 9/2019 | |
| NL | 1027236 C2 | 4/2006 | |
| WO | WO-0021433 A1 | 4/2000 | |
| WO | WO-0043046 A2 | 7/2000 | |
| WO | WO-03067229 A1 | 8/2003 | |
| WO | WO-2006041997 A2 | 4/2006 | |
| WO | WO-2007030379 A2 | 3/2007 | |
| WO | WO-2008006150 A1 | 1/2008 | |
| WO | WO-2008010604 A1 | 1/2008 | |
| WO | WO-2009052607 A1 | 4/2009 | |
| WO | WO-2009120951 A2 | 10/2009 | |
| WO | WO-2009141777 A1 | 11/2009 | |
| WO | WO-2010020919 A1 | 2/2010 | |
| WO | WO-2010105053 A2 | 9/2010 | |
| WO | WO-2011082420 A1 | 7/2011 | |
| WO | WO-2011123848 A1 | 10/2011 | |
| WO | WO-2012141999 A1 | 10/2012 | |
| WO | WO-2012156655 A1 | 11/2012 | |
| WO | WO-2013026999 A1 | 2/2013 | |
| WO | WO-2013044226 A2 | 3/2013 | |
| WO | WO-2014036577 A1 | 3/2014 | |
| WO | WO-2014116816 A1 | 7/2014 | |
| WO | WO-2014140606 A1 | 9/2014 | |
| WO | WO-2015112095 A1 | 7/2015 | |
| WO | WO-2015168720 A1 | 11/2015 | |
| WO | WO-2016025438 A1 | 2/2016 | |
| WO | WO-2016030752 A1 | 3/2016 | |
| WO | WO-2016058032 A1 | 4/2016 | |
| WO | WO-2016073777 A1 | 5/2016 | |
| WO | WO-2016100218 A1 | 6/2016 | |
| WO | WO-2016110564 A1 | 7/2016 | |
| WO | WO-2016187136 A1 | 11/2016 | |
| WO | WO-2016205872 A1 | 12/2016 | |
| WO | WO-2016205881 A1 | 12/2016 | |
| WO | WO-2017021006 A1 | 2/2017 | |
| WO | WO-2017021965 A2 | 2/2017 | |
| WO | WO-2017033058 A1 | 3/2017 | |
| WO | WO-2017037479 A1 | 3/2017 | |
| WO | WO-2017040692 A1 * | 3/2017 | ......... A61B 1/00071 |
| WO | WO-2017041014 A1 | 3/2017 | |
| WO | WO-2017041385 A1 | 3/2017 | |
| WO | WO-2017041386 A1 | 3/2017 | |
| WO | WO-2017041387 A1 | 3/2017 | |
| WO | WO-2017119996 A1 | 7/2017 | |
| WO | WO-2017195038 A1 * | 11/2017 | ............. A61B 5/445 |
| WO | WO-2017205728 A1 | 11/2017 | |
| WO | WO-2017214188 A1 | 12/2017 | |
| WO | WO-2018035612 A1 | 3/2018 | |
| WO | WO-2018060417 A1 | 4/2018 | |
| WO | WO-2018064569 A1 | 4/2018 | |
| WO | WO-2018115461 A1 | 6/2018 | |
| WO | WO-2018144938 A1 | 8/2018 | |
| WO | WO-2018144941 A1 | 8/2018 | |
| WO | WO-2018144943 A1 | 8/2018 | |
| WO | WO-2018144946 A1 | 8/2018 | |
| WO | WO-2018185138 A1 | 10/2018 | |
| WO | WO-2018189265 A1 | 10/2018 | |
| WO | WO-2018209090 A1 | 11/2018 | |
| WO | WO-2018210692 A1 | 11/2018 | |
| WO | WO-2018211458 A1 | 11/2018 | |
| WO | WO-2018226630 A1 | 12/2018 | |
| WO | WO-2018234443 A1 | 12/2018 | |
| WO | WO-2019020550 A2 | 1/2019 | |
| WO | WO-2019020551 A1 | 1/2019 | |
| WO | WO-2019020666 A1 | 1/2019 | |
| WO | WO-2019030384 A2 | 2/2019 | |
| WO | WO-2019048624 A1 | 3/2019 | |
| WO | WO-2019048626 A1 | 3/2019 | |
| WO | WO-2019048638 A1 | 3/2019 | |
| WO | WO-2019063481 A1 | 4/2019 | |
| WO | WO-2019063488 A2 | 4/2019 | |
| WO | WO-2019067264 A1 | 4/2019 | |

(56) References Cited

FOREIGN PATENT DOCUMENTS

| | | |
|---|---|---|
| WO | WO-2019072531 A1 | 4/2019 |
| WO | WO-2019076967 A2 | 4/2019 |
| WO | WO-2019096828 A1 | 5/2019 |
| WO | WO-2019140441 A2 | 7/2019 |
| WO | WO-2019140444 A1 | 7/2019 |
| WO | WO-2019140448 A1 | 7/2019 |
| WO | WO-2019140449 A1 | 7/2019 |
| WO | WO-2019193141 A1 | 10/2019 |
| WO | WO-2019216883 A1 | 11/2019 |
| WO | WO-2019230183 A1 | 12/2019 |
| WO | WO-2019238180 A1 | 12/2019 |
| WO | WO-2019238181 A1 | 12/2019 |
| WO | WO-2019238182 A1 | 12/2019 |
| WO | WO-2019238195 A1 | 12/2019 |
| WO | WO-2019238196 A1 | 12/2019 |
| WO | WO-2019238197 A1 | 12/2019 |
| WO | WO-2019238198 A1 | 12/2019 |
| WO | WO-2020002416 A1 | 1/2020 |
| WO | WO-2020043806 A1 | 3/2020 |
| WO | WO-2020139541 A1 | 7/2020 |
| WO | WO-2020157103 A1 | 8/2020 |
| WO | WO-2020159677 A1 | 8/2020 |
| WO | WO-2020167547 A1 | 8/2020 |
| WO | WO-2020242876 A1 | 12/2020 |
| WO | WO-2021059209 A1 | 4/2021 |

OTHER PUBLICATIONS

CA-3059516-A1 translated (Year: 2018).*
DE-102018202433-A1 translated (Year: 2018).*
WO-2017040692-A1 translated (Year: 2017).*
Aubakir B., et al., "Vital Sign Monitoring Utilizing Eulerian Video Magnification and Thermography," 38th Annual International Conference of the IEEE Engineering in Medicine and Biology Society, Aug. 16, 2016, pp. 3527-3530 (4 pages).
Bandodkar A.J., et al., "Battery-Free, Skin-Interfaced Microfluidic/ Electronic Systems for Simultaneous Electrochemical, Colorimetric and Volumetric Analysis of Sweat," Science Advances, vol. 5 (1), Jan. 18, 2019, retrieved from http://advances.sciencemag.org/content/5/1/eaav3294, 16 pages.
Cauwe M., et al., "Technology Development for a Low-Cost, Roll-to-Roll Chip Embedding Solution Based on PET Foils," 18th European Microelectronics and Packaging Conference (EMPC), IEEE, Sep. 12, 2011, 6 pages.
Farooqui M.F., et al., "Low Cost Inkjet Printed Smart Bandage for Wireless Monitoring of Chronic Wounds," Scientific Reports, vol. 6, Jun. 29, 2016, 14 pages.
Geng Y., et al., "A Hybrid Low Power Biopatch for Body Surface Potential Measurement," IEEE Journal of Biomedical and Health Informatics, vol. 17, No. 3, May 1, 2013, pp. 591-599.
George J., et al., "Reliability of Plastic-Encapsulated Electronic Components in Supersaturated Steam Environments," IEEE Transactions on Components, Packaging and Manufacturing Technology, vol. 5 (10), Oct. 2015, pp. 1423-1431.
Iannetta Jr. R.A., et al., "Successful Case Histories of Polymer Based Circuitry on Flexible Film Substrates," Electro/94 International Conference Proceedings Combined Volumes, IEEE, XP010149465, May 10-12, 1994, pp. 885-889.
International Search Report and Written Opinion for Application No. PCT/EP2020/052111, mailed on Apr. 8, 2020, 11 pages.
Little Miss Plasters, kidstravelclub.co.uk., retrieved from http://www.kidstravelclub.co.uk/little-miss-girls-childrens-plasters on Aug. 26, 2016, 2 pages.
Lu B., et al., "A Study of the Autofluorescence of Parylene Materials for µTAS Applications," Lab on Chip, vol. 10 (14), Jul. 2010, pp. 1826-1834.
McLeod A.J., et al., "Motion Magnification for Endoscopic Surgery," Progress in Biomedical Optics and Imaging, SPIE—International Society for Optical Engineering, Mar. 12, 2014, vol. 9036, 8 pages.
Mostafalu P., et al., "Wireless Flexible Smart Bandage for Continuous Monitoring of Wound Oxygenation," IEEE Transactions on Biomedical Circuits and Systems, vol. 9 (5), Oct. 2015, pp. 670-677 (8 pages).
Narusawa H., "The Corona Discharge Causes Short Destruction that had Bad Influence on a Power Switching Circuit," Adphox Corporation, Jan. 1, 2009, retrieved from http://www.adphox.co.jp/keisokuki/ke-english-corona/CORONA_DISCHARGE_EN.pdf, 12 pages.
Raviglione A., et al., "Real-Time Smart Textile-Based System to Monitor Pressure Offloading of Diabetic Foot Ulcers," Journal of Diabetes Science and Technology, vol. 11 (5), Sep. 2017, pp. 894-898.
Rose D.P., et al., "Adhesive RFID Sensor Patch for Monitoring of Sweat Electrolytes," IEEE Transactions on Biomedical Engineering, vol. 62 (6), Jun. 2015, first published on Nov. 11, 2015, pp. 1457-1465.
Wakita J., et al., "Variations in Optical Absorption and Fluorescence Spectra for Polyimide Thin Films Caused by Structural Isomerism," Journal of Photopolymer Science and Technology, Jan. 1, 2003, 1 page.
Willis B., "Conformal Coating Inspection & Coating Faults," Vision Engineering, Jul. 21, 2016, retrieved from http://www.visioneng.com/wp-content/uploads/2017/11/Conformal-Coating-Inspection-and-Defects.21JUL16.pdf, 35 pages.
Willis B., "Guide to Conformal Coating & Cleaning Defects Contents," Mar. 1, 2014, retrieved from http://coatingguide.smartgroup.org/Files%20pdf/Coating%20Defects%20V2%2014March2014.pdf, vol. 1, 31 pages.
International Preliminary Report on Patentability for Application No. PCT/EP2020/052111, mailed on Aug. 12, 2021, 9 pages.
Mehmood N., et al., "Applications of Modern Sensors and Wireless Technology in Effective Wound Management: Modern Sensors and Wireless Technology," Journal of Biomedical Materials Research Part B, vol. 102, May 1, 2014, XP055739544, pp. 885-895.
Pang Q., et al., "Smart Flexible Electronics-Integrated Wound Dressing for Real-Time Monitoring and On-Demand Treatment of Infected Wounds," Advanced Science, vol. 7, No. 6, Mar. 2020, 1902673, XP055739532, 10 pages.

* cited by examiner

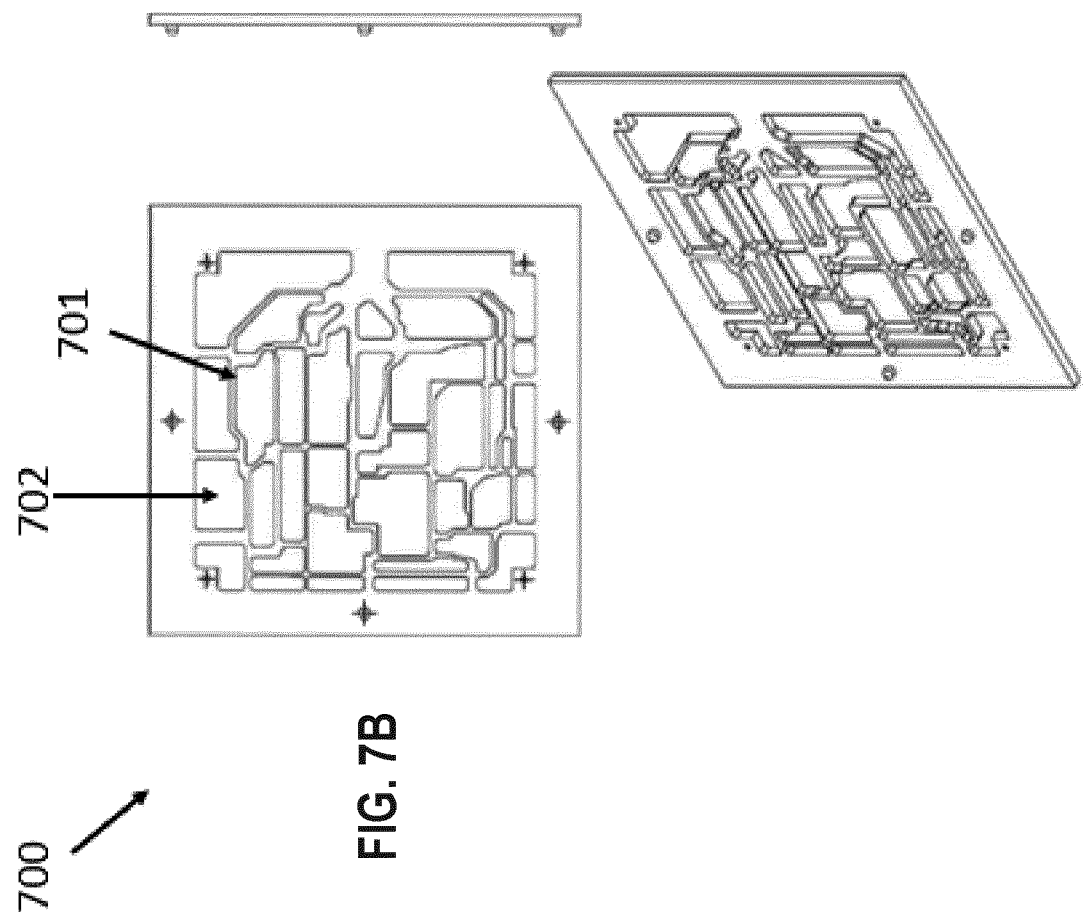

SENSOR INTEGRATED DRESSINGS AND SYSTEMS

CROSS-REFERENCE TO RELATED APPLICATIONS

This application is a U.S. national stage application of International Patent Application No. PCT/EP2020/052111, filed Jan. 29, 2020, which claims priority to U.K. Provisional Application No. GB1 905696.9, filed on Apr. 24, 2019, entitled "SENSOR INTEGRATED DRESSINGS AND SYSTEMS", and also claims priority to U.K. Provisional Application No. GB1901264.0, filed Jan. 30, 2019, entitled "SENSOR INTEGRATED DRESSINGS AND SYSTEMS", the disclosure of which is hereby incorporated by reference in its entirety.

FIELD

Embodiments of the present disclosure relate to apparatuses, systems, and methods for the monitoring and/or treatment of tissue with sensor integrated or sensor-enabled dressings.

DESCRIPTION OF THE RELATED ART

Nearly all areas of medicine may benefit from improved information regarding the state of the tissue, organ, or system to be treated, particularly if such information is gathered in real-time during treatment, many types of treatments are still routinely performed without the use of sensor data collection. Instead, such treatments rely upon visual inspection by a caregiver or other limited means rather than quantitative sensor data. For example, in the case of wound treatment via dressings and/or negative pressure wound therapy, data collection is generally limited to visual inspection by a caregiver and often the underlying wounded tissue may be obscured by bandages or other visual impediments. Even intact, unwounded skin may have underlying damage that is not visible to the naked eye, such as a compromised vascular or deeper tissue damage that may lead to an ulcer. Similar to wound treatment, during orthopedic treatments requiring the immobilization of a limb with a cast or other encasement, only limited information is gathered on the underlying tissue. In instances of internal tissue repair, such as a bone plate, continued direct sensor-driven data collection is not performed. Further, braces and/or sleeves used to support musculoskeletal function do not monitor the functions of the underlying muscles or the movement of the limbs. Outside of direct treatments, common hospital room items such as beds and blankets could be improved by adding capability to monitor patient parameters.

Therefore, there is a need for improved sensor monitoring, particularly through the use of sensor integrated substrates which can be incorporated into existing treatment regimes.

SUMMARY

In some cases, a method of manufacturing a wound dressing can comprise coating a first, wound-facing side of a substantially flexible substrate with a first coating, the substrate comprising a second side opposite the first side, the first side of the substrate supporting a plurality of electronic components, wherein the first coating is applied to at least some of the plurality of electronic components, coating the first side with a second coating, wherein the second coating is applied over the first coating, perforating the substrate coated with the first and second coating to create a plurality of through holes through the substrate coated with the first and second coating, the plurality of through holes configured to facilitate passage of fluid through the substrate, and adhering a protective layer to the substrate, the protective layer configured to be removed to expose the first side of the substrate.

The method of the preceding paragraph and/or any of the methods disclosed herein can include one or more of the following features. The method can further comprise coating the second side of the substrate with a third coating, wherein the third coating is the same coating as the second coating. The first coating can be a substantially non-stretchable coating. The second coating can be a substantially stretchable coating. The substrate can be supported by a jig during perforation of the plurality of through holes, wherein the jig comprises support struts that align with areas of the substrate corresponding to the plurality of electronic components. Perforating the substrate can comprise utilizing a custom cutting pattern that corresponds to the layout of the plurality of electronic components. Perforating the substrate can comprise cutting a plurality of substantially circular through holes. Perforating the substrate can comprise cutting large areas of through holes. The plurality of electronic components can comprise a plurality of sensors configured to obtain measurements of the wound, at least some of the plurality of sensors interconnected by a plurality of electronic connections. The second coating can cover substantially an entire area of the first side of the substrate. The third coating can cover substantially an entire area of the second side of the substrate. The protective layer can comprise first and second portions separated by a slit, the first portion extending over the second portion to cover the slit. The protective layer can comprise a handle.

In some cases, a wound dressing can comprise a substantially flexible substrate with a first, wound-facing side supporting a plurality of electronic components and a second side opposite the first side, a substantially non-stretchable coating applied to at least some of the plurality of electronic components, a substantially stretchable coating applied to the first side of the substrate, the stretchable coating applied over the substantially non-stretchable coating, and a protective layer applied to the first side of the substrate, the protective layer configured to be removed to expose the first side of the substrate.

The wound dressing of any preceding paragraphs and/or any of the wound dressings disclosed herein can include one or more of the following features. The dressing can further comprise a plurality of perforations formed through the stretchable coating and the substrate, the plurality of perforations configured to facilitate passage of fluid. The dressing can further comprise a coating applied to the second side of the substrate, wherein the coating comprises substantially hydrophobic material. The coating can comprise the same material as that of the stretchable coating applied to the first side of the substrate. The coating can comprise a different material from that of the stretchable coating applied to the first side of the substrate. The plurality of perforations can be further formed through the coating applied to the second side of the substrate. The plurality of electronic components can comprise a plurality of sensors configured to obtain measurements of the wound, at least some of the plurality of sensors interconnected by a plurality of electronic connections. The stretchable coating can cover substantially an entire area of the first side of the substrate. The protective layer can comprise first and second portions separated by a slit, the first portion extending over the second portion to cover the slit.

In some cases, a kit can include the dressing of any preceding paragraphs and/or any of the dressings disclosed herein and a negative pressure wound therapy device configured to supply negative pressure to the wound covered by the dressing.

The kit of any preceding paragraph and/or any of the kits disclosed herein can include one or more of the following features. The dressing and the negative pressure wound therapy device can be sterile. The kit can further comprise a secondary dressing configured to be positioned over the dressing.

In some cases, a method of manufacturing a wound dressing can comprise coating a first, wound-facing side of a substantially flexible substrate with a first coating, the substrate can comprise a second side opposite the first side, the first side of the substrate supporting a plurality of electronic components, wherein the first coating is applied to at least some of the plurality of electronic components, coating the first side with a second coating, wherein the second coating is applied over the first coating, adhering a wound contact layer to the first side and in contact with the second coating, the wound contact layer configured to contact a wound, perforating the wound contact layer and the substrate coated with the first and second coating to create a plurality of through holes through the wound contact layer and the substrate coated with the first and second coating, the plurality of through holes configured to facilitate passage of fluid through the wound contact layer and the substrate, and adhering a protective layer to the wound contact layer, the protective layer configured to be removed to expose the wound contact layer, and adhering a wicking layer to the second side of the substrate, the wicking layer configured to facilitate passage of fluid.

The method of the preceding paragraph and/or any of the methods disclosed herein can include one or more of the following features. The first coating can be a substantially non-stretchable coating. The second coating can be a substantially stretchable coating. The method can further comprise, prior to adhering the wicking layer to the second side of the substrate, coating the second side with the second coating. The method can further comprise prior to adhering the wicking layer to the second side of the substrate, applying an adhesive to the second side of the substrate to adhere the wicking layer. The method can further comprise prior to adhering the wicking layer to the second side of the substrate, applying an adhesive to the coating on the second side of the substrate to adhere the wicking layer. The method can further comprise exposing the dressing to ultraviolet light to cure the adhesive. The substrate, the first and second coatings, the wound contact layer, and the protective layer can be transparent, translucent, or optically clear to allow ultraviolet light to penetrate through and cure the adhesive between the substrate and the wicking layer. The method can further comprise positioning holes in the wound contact layer over areas of the substrate that supports the plurality of electronic components when the wound contact layer is adhered to the second coating. The holes can be slightly larger than the circumference or outer perimeter of at least one electronic component of the plurality of electronic components. The wound contact layer and substrate can be supported by a jig during perforation of the plurality of through holes, wherein the jig comprises support struts that align with areas of the substrate corresponding to the plurality of electronic components. Perforating the wound contact layer and the substrate can comprise utilizing a custom cutting pattern that corresponds to the layout of the plurality of electronic components. Perforating the wound contact layer and the substrate can comprise cutting a plurality of substantially circular through holes. Perforating the wound contact layer and the substrate can comprise cutting large areas of through holes. The plurality of electronic components can comprise a plurality of sensors configured to obtain measurements of the wound, at least some of the plurality of sensors interconnected by a plurality of electronic connections. The wound contact layer can comprise silicone. The second coating can cover substantially an entire area of the first side of the substrate. The wicking layer can comprise foam. The foam can be substantially stretchable. The protective layer can comprise first and second portions separated by a slit, the first portion extending over the second portion to cover the slit. The protective layer can comprise a handle.

In some cases, a wound dressing includes a substantially flexible substrate with a first, wound-facing side supporting a plurality of electronic components and a second side opposite the first side, a wicking layer in contact with the second side of the substrate, the wicking layer configured to facilitate passage of fluid, a substantially non-stretchable coating applied to at least some of the plurality of electronic components, a substantially stretchable coating applied to the first side of the substrate, the stretchable coating applied over the substantially non-stretchable coating, a wound contact layer in contact with the stretchable coating, the wound contact layer configured to adhere to a wound, and a protective layer applied to the wound contact layer, the protective layer configured to be removed to expose the wound contact layer.

The wound dressing of any preceding paragraphs and/or any of the wound dressings disclosed herein can include one or more of the following features. The dressing can further include a plurality of perforations formed through the wound contact layer, the stretchable coating, and the substrate, the plurality of perforations configured to facilitate passage of fluid. The dressing can further include a coating applied to the second side of the substrate, wherein the coating can include substantially hydrophobic material, and wherein the wicking layer can be in contact with the coating applied to the second side of the substrate. The coating can include the same material as that of the stretchable coating applied to the first side of the substrate. The coating can include a different material from that of the stretchable coating applied to the first side of the substrate. The plurality of perforations can be further formed through the coating applied to the second side of the substrate. The plurality of electronic components can include a plurality of sensors configured to obtain measurements of the wound, at least some of the plurality of sensors interconnected by a plurality of electronic connections.

The wound dressing of any preceding paragraphs and/or any of the wound dressings disclosed herein can include one or more of the following features. The wound contact layer can include silicone. The stretchable coating can cover substantially an entire area of the first side of the substrate. The wicking layer can include foam. Foam can be substantially stretchable. The protective layer can include first and second portions separated by a slit, the first portion extending over the second portion to cover the slit.

In some cases, a kit can include the dressing of any preceding paragraphs and/or any of the dressings disclosed herein and a negative pressure wound therapy device configured to supply negative pressure to the wound covered by the dressing.

The kit of any preceding paragraph and/or any of the kits disclosed herein can include one or more of the following features. The dressing and the negative pressure wound therapy device can be sterile. The kit can include a secondary dressing configured to be positioned over the dressing.

BRIEF DESCRIPTION OF THE DRAWINGS

Embodiments of the present disclosure will now be described hereinafter, by way of example only, with reference to the accompanying drawings in which:

FIGS. 7A-7D illustrate multiple views of a jig which rests the areas of the substrate corresponding to electronic components or electronic connections on the jig;

DETAILED DESCRIPTION

Figure 1A:
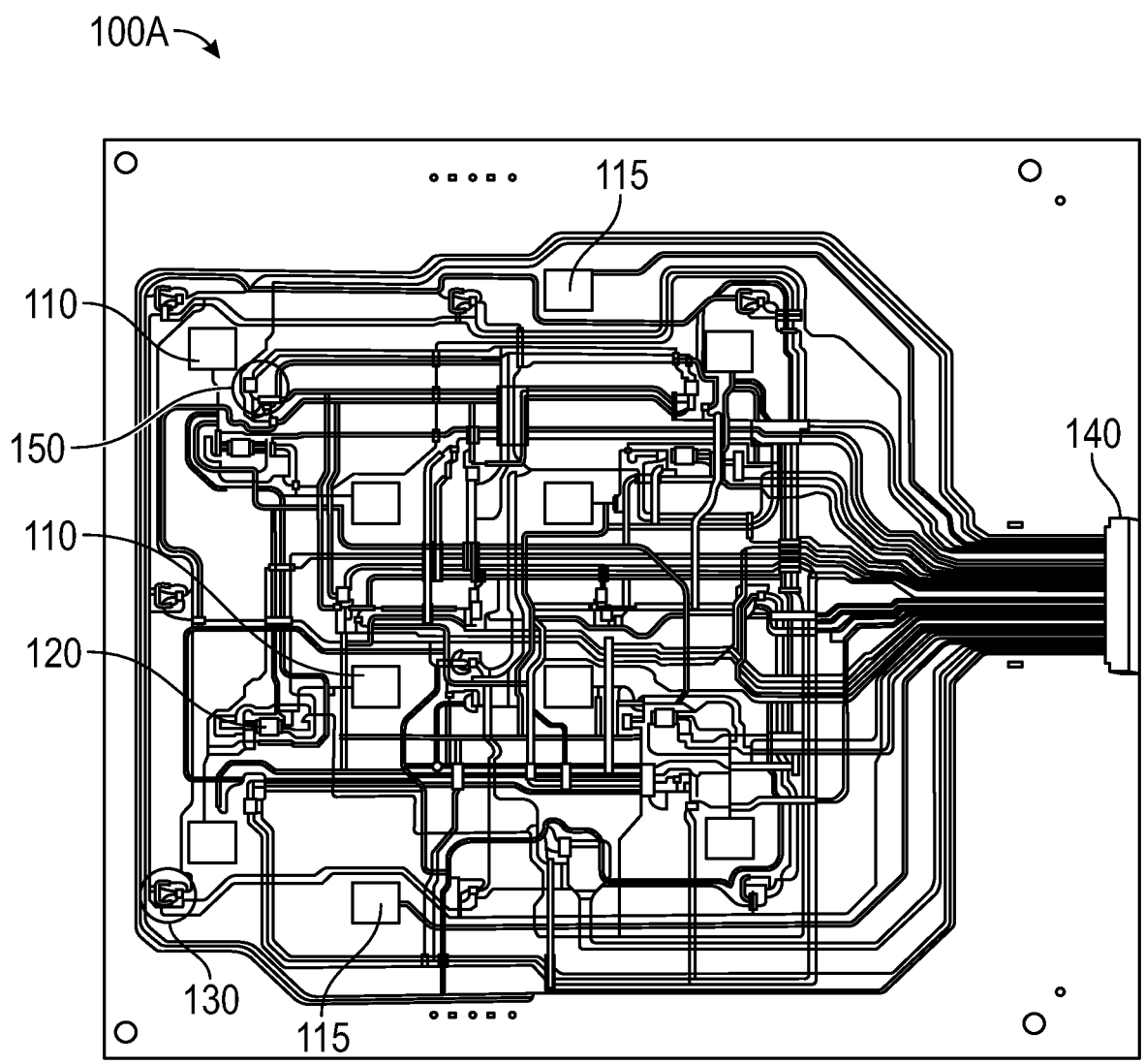
FIG. 1A illustrates a perspective view of a substrate supporting electronic components.

Embodiments disclosed herein relate to apparatuses and methods of at least one of monitoring or treating biological tissue with sensor-enabled substrates. The embodiments disclosed herein are not limited to treatment or monitoring of a particular type of tissue or injury, instead the sensor-enabled technologies disclosed herein are broadly applicable to any type of therapy that may benefit from sensor-enabled substrates. Some implementations utilize sensors and data collection relied upon by health care providers to make both diagnostic and patient management decisions.

Certain embodiments disclosed herein relate to the use of sensors mounted on or embedded within substrates configured to be used in the treatment of both intact and damaged human or animal tissue. Such sensors may collect information about the surrounding tissue and transmit such information to a computing device or a caregiver to be utilized in further treatment. In certain cases, such sensors may be attached to the skin anywhere on the body, including areas for monitoring arthritis, temperature, or other areas that may be prone to problems and require monitoring. Sensors disclosed herein may also incorporate markers, such as radiopaque markers, to indicate the presence of the device, for example prior to performing an MRI or other technique.

The sensor embodiments disclosed herein may be used in combination with clothing. Non-limiting examples of clothing for use with embodiments of the sensors disclosed herein include shirts, pants, trousers, dresses, undergarments, outer-garments, gloves, shoes, hats, and other suitable garments. In certain embodiments, the sensor embodiments disclosed herein may be welded into or laminated into/onto the particular garments. The sensor embodiments may be printed directly onto the garment and/or embedded into the fabric. Breathable and printable materials such as microporous membranes may also be suitable.

Sensor embodiments disclosed herein may be incorporated into cushioning or bed padding, such as within a hospital bed, to monitor patient characteristics, such as any characteristic disclosed herein. In certain embodiments, a disposable film containing such sensors could be placed over the hospital bedding and removed/replaced as needed.

In some implementations, the sensor embodiments disclosed herein may incorporate energy harvesting, such that the sensor embodiments are self-sustaining. For example, energy may be harvested from thermal energy sources, kinetic energy sources, chemical gradients, or any suitable energy source.

The sensor embodiments disclosed herein may be utilized in rehabilitation devices and treatments, including sports medicine. For example, the sensor embodiments disclosed herein may be used in braces, sleeves, wraps, supports, and other suitable items. Similarly, the sensor embodiments disclosed herein may be incorporated into sporting equipment, such as helmets, sleeves, and/or pads. For example, such sensor embodiments may be incorporated into a protective helmet to monitor characteristics such as acceleration, which may be useful in concussion diagnosis.

The sensor embodiments disclosed herein may be used in coordination with surgical devices, for example, the NAVIO surgical system by Smith & Nephew Inc. In some implementations, the sensor embodiments disclosed herein may be in communication with such surgical devices to guide placement of the surgical devices. In some implementations, the sensor embodiments disclosed herein may monitor blood flow to or away from the potential surgical site or ensure that there is no blood flow to a surgical site. Further surgical data may be collected to aid in the prevention of scarring and monitor areas away from the impacted area.

To further aid in surgical techniques, the sensors disclosed herein may be incorporated into a surgical drape to provide information regarding tissue under the drape that may not be immediately visible to the naked eye. For example, a sensor embedded flexible drape may have sensors positioned advantageously to provide improved area-focused data collection. In certain implementations, the sensor embodiments disclosed herein may be incorporated into the border or interior of a drape to create fencing to limit/control the surgical theater.

Sensor embodiments as disclosed herein may also be utilized for pre-surgical assessment. For example, such sensor embodiments may be used to collect information about a potential surgical site, such as by monitoring skin and the underlying tissues for a possible incision site. For example, perfusion levels or other suitable characteristics may be monitored at the surface of the skin and deeper in the tissue to assess whether an individual patient may be at risk for surgical complications. Sensor embodiments such as those disclosed herein may be used to evaluate the presence of microbial infection and provide an indication for the use of antimicrobials. Further, sensor embodiments disclosed herein may collect further information in deeper tissue, such as identifying pressure ulcer damage and/or the fatty tissue levels.

The sensor embodiments disclosed herein may be utilized in cardiovascular monitoring. For example, such sensor embodiments may be incorporated into a flexible cardiovascular monitor that may be placed against the skin to monitor characteristics of the cardiovascular system and communicate such information to another device and/or a caregiver. For example, such a device may monitor pulse rate, oxygenation of the blood, and/or electrical activity of the heart. Similarly, the sensor embodiments disclosed herein may be utilized for neurophysiological applications, such as monitoring electrical activity of neurons.

The sensor embodiments disclosed herein may be incorporated into implantable devices, such as implantable orthopedic implants, including flexible implants. Such sensor embodiments may be configured to collect information regarding the implant site and transmit this information to an external source. In some cases, an internal source may also provide power for such an implant.

The sensor embodiments disclosed herein may also be utilized for monitoring biochemical activity on the surface of the skin or below the surface of the skin, such as lactose buildup in muscle or sweat production on the surface of the skin. In some cases, other characteristics may be monitored, such as glucose concentration, urine concentration, tissue pressure, skin temperature, skin surface conductivity, skin surface resistivity, skin hydration, skin maceration, and/or skin ripping.

Sensor embodiments as disclosed herein may be incorporated into Ear, Nose, and Throat (ENT) applications. For example, such sensor embodiments may be utilized to monitor recovery from ENT-related surgery, such as wound monitoring within the sinus passage.

Sensor embodiments disclosed herein may encompass sensor printing technology with encapsulation, such as encapsulation with a polymer film. Such a film may be constructed using any polymer described herein, such as polyurethane. Encapsulation of the sensor embodiments may provide waterproofing of the electronics and protection from local tissue, local fluids, and other sources of potential damage.

In certain embodiments, the sensors disclosed herein may be incorporated into an organ protection layer. Such a sensor-embedded organ protection layer may both protect the organ of interest and confirm that the organ protection layer is in position and providing protection. Further, a sensor-embedded organ protection layer may be utilized to monitor the underlying organ, such as by monitoring blood flow, oxygenation, and other suitable markers of organ health. In some cases, a sensor-enabled organ protection layer may be used to monitor a transplanted organ, such as by monitoring the fat and muscle content of the organ. Further, sensor-enabled organ protection layers may be used to monitor an organ during and after transplant, such as during rehabilitation of the organ.

The sensor embodiments disclosed herein may be incorporated into treatments for wounds (disclosed in greater detail below) or in a variety of other applications. Non-limiting examples of additional applications for the sensor embodiments disclosed herein include: monitoring and treatment of intact skin, cardiovascular applications such as monitoring blood flow, orthopedic applications such as monitoring limb movement and bone repair, neurophysiological applications such as monitoring electrical impulses, and any other tissue, organ, system, or condition that may benefit from improved sensor-enabled monitoring.

Wound Therapy

Some systems and methods disclosed herein relate to wound therapy for a human or animal body. Therefore, any reference to a wound herein can refer to a wound on a human or animal body, and any reference to a body herein can refer to a human or animal body. The disclosed technology embodiments may relate to preventing or minimizing damage to physiological tissue or living tissue, or to the treatment of damaged tissue (for example, a wound as described herein) wound with or without reduced pressure, including for example a source of negative pressure and wound dressing components and apparatuses. The apparatuses and components comprising the wound overlay and packing materials or internal layers, if any, are sometimes collectively referred to herein as dressings. In some cases, the wound dressing can be provided to be utilized without reduced pressure.

As used herein the expression "wound" may include an injury to living tissue may be caused by a cut, blow, or other impact, typically one in which the skin is cut or broken. A wound may be a chronic or acute injury. Acute wounds occur as a result of surgery or trauma. They move through the stages of healing within a predicted timeframe. Chronic wounds typically begin as acute wounds. The acute wound can become a chronic wound when it does not follow the healing stages resulting in a lengthened recovery. It is believed that the transition from acute to chronic wound can be due to a patient being immuno-compromised.

Chronic wounds may include for example: venous ulcers (such as those that occur in the legs), which account for the majority of chronic wounds and mostly affect the elderly, diabetic ulcers (for example, foot or ankle ulcers), peripheral arterial disease, pressure ulcers, or epidermolysis bullosa (EB).

Examples of other wounds include, but are not limited to, abdominal wounds or other large or incisional wounds, either as a result of surgery, trauma, sterniotomies, fasciotomies, or other conditions, dehisced wounds, acute wounds, chronic wounds, subacute and dehisced wounds, traumatic wounds, flaps and skin grafts, lacerations, abrasions, contusions, burns, diabetic ulcers, pressure ulcers, stoma, surgical wounds, trauma and venous ulcers or the like.

Wounds may also include a deep tissue injury. Deep tissue injury is a term proposed by the National Pressure Ulcer Advisory Panel (NPUAP) to describe a unique form of pressure ulcers. These ulcers have been described by clinicians for many years with terms such as purple pressure ulcers, ulcers that are likely to deteriorate and bruises on bony prominences.

Wound may also include tissue at risk of becoming a wound as discussed herein. For example, tissue at risk may include tissue over a bony protuberance (at risk of deep tissue injury/insult) or pre-surgical tissue (for example, knee tissue) that may have the potential to be cut (for example, for joint replacement/surgical alteration/reconstruction).

Some implementations relate to methods of treating a wound with the technology disclosed herein in conjunction with one or more of the following: advanced footwear, turning a patient, offloading (such as, offloading diabetic foot ulcers), treatment of infection, systemix, antimicrobial, antibiotics, surgery, removal of tissue, affecting blood flow, physiotherapy, exercise, bathing, nutrition, hydration, nerve stimulation, ultrasound, electrostimulation, oxygen therapy, microwave therapy, active agents ozone, antibiotics, antimicrobials, or the like.

Alternatively or additionally, a wound may be treated using topical negative pressure (TNP) and/or traditional advanced wound care, which is not aided by the using of applied negative pressure (may also be referred to as non-negative pressure therapy).

Advanced wound care may include use of an absorbent dressing, an occlusive dressing, use of an antimicrobial and/or debriding agents in a wound dressing or adjunct, a pad (for example, a cushioning or compressive therapy, such as stockings or bandages), or the like.

In some cases, a wound dressing comprises one or more absorbent layer(s). The absorbent layer may be a foam or a superabsorbent.

In some cases, the disclosed technology may be used in conjunction with a non-negative pressure dressing. A non-negative pressure wound dressing suitable for providing protection at a wound site may comprise an absorbent layer for absorbing wound exudate and an obscuring element for at least partially obscuring a view of wound exudate absorbed by the absorbent layer in use. The obscuring element may be partially translucent. The obscuring element may be a masking layer.

In some cases, the non-negative pressure wound dressing as disclosed herein comprises the wound contact layer and the absorbent layer overlies the wound contact layer. The wound contact layer can carry an adhesive portion for forming a substantially fluid tight seal over the wound.

In some cases, the wound dressing as disclosed herein further comprises layer of a superabsorbent fiber, or a viscose fiber or a polyester fiber.

In some cases, the wound dressing as disclosed herein further comprises a backing layer. The backing layer may be a transparent or opaque film. Typically the backing layer comprises a polyurethane film (typically a transparent polyurethane film).

In some cases, the foam may be an open cell foam, or closed cell foam, typically an open cell foam. The foam can be hydrophilic.

The wound dressing may comprise a transmission layer and the layer can be foam. The transmission layer may be a polyurethane foam laminated to a polyurethane film.

The non-negative pressure wound dressing may be a compression bandage. Compression bandages are known for use in the treatment of oedema and other venous and lymphatic disorders, e.g., of the lower limbs. The compression bandage may comprise a bandage system comprising an inner skin facing layer and an elastic outer layer, the inner layer comprising a first ply of foam and a second ply of an absorbent nonwoven web, the inner layer and outer layer being sufficiently elongated so as to be capable of being wound about a patient's limb.

Negative Pressure Wound Therapy

In some cases, treatment of wounds can be performed using negative pressure wound therapy. It will be understood that embodiments of the present disclosure are generally applicable to use in TNP systems. Briefly, negative pressure wound therapy assists in the closure and healing of many forms of "hard to heal" wounds by reducing tissue oedema; encouraging blood flow and granular tissue formation; removing excess exudate and may reduce bacterial load (and thus infection risk). In addition, the therapy allows for less disturbance of a wound leading to more rapid healing. TNP therapy systems may also assist on the healing of surgically closed wounds by removing fluid and by helping to stabilize the tissue in the apposed position of closure. A further beneficial use of TNP therapy can be found in grafts and flaps where removal of excess fluid is important and close proximity of the graft to tissue is required in order to ensure tissue viability.

Negative pressure therapy can be used for the treatment of open or chronic wounds that are too large to spontaneously close or otherwise fail to heal by means of applying negative pressure to the site of the wound. Topical negative pressure (TNP) therapy or negative pressure wound therapy (NPWT) involves placing a cover that is impermeable or semi-permeable to fluids over the wound, using various means to seal the cover to the tissue of the patient surrounding the wound, and connecting a source of negative pressure (such as a vacuum pump) to the cover in a manner so that negative pressure is created and maintained under the cover. It is believed that such negative pressures promote wound healing by facilitating the formation of granulation tissue at the wound site and assisting the body's normal inflammatory process while simultaneously removing excess fluid, which may contain adverse cytokines or bacteria.

Some of the dressings used in NPWT can include many different types of materials and layers, for example, gauze, pads, foam pads or multi-layer wound dressings. One example of a multi-layer wound dressing is the PICO dressing, available from Smith & Nephew, includes a wound contact layer and a superabsorbent layer beneath a backing layer to provide a canister-less system for treating a wound with NPWT. The wound dressing may be sealed to a suction port providing connection to a length of tubing, which may be used to pump fluid out of the dressing or to transmit negative pressure from a pump to the wound dressing. Additionally, RENASYS-F, RENASYS-G, RENASYS-AB, and RENASYS-F/AB, available from Smith & Nephew, are additional examples of NPWT wound dressings and systems. Another example of a multi-layer wound dressing is the ALLEVYN Life dressing, available from Smith & Nephew, which includes a moist wound environment dressing that is used to treat the wound without the use of negative pressure.

As is used herein, reduced or negative pressure levels, such as −X mmHg, represent pressure levels relative to normal ambient atmospheric pressure, which can correspond to 760 mmHg (or 1 atm, 29.93 inHg, 101.325 kPa, 14.696 psi, etc.). Accordingly, a negative pressure value of −X mmHg reflects absolute pressure that is X mmHg below 760 mmHg or, in other words, an absolute pressure of (760−X) mmHg. In addition, negative pressure that is "less" or "smaller" than X mmHg corresponds to pressure that is closer to atmospheric pressure (such as, −40 mmHg is less than −60 mmHg). Negative pressure that is "more" or "greater" than −X mmHg corresponds to pressure that is further from atmospheric pressure (such as, −80 mmHg is more than −60 mmHg). In some cases, local ambient atmospheric pressure is used as a reference point, and such local atmospheric pressure may not necessarily be, for example, 760 mmHg.

In some cases of wound closure devices described herein, increased wound contraction can lead to increased tissue expansion in the surrounding wound tissue. This effect may be increased by varying the force applied to the tissue, for example by varying the negative pressure applied to the wound over time, possibly in conjunction with increased tensile forces applied to the wound via embodiments of the wound closure devices. In some cases, negative pressure may be varied over time for example using a sinusoidal wave, square wave, or in synchronization with one or more physiological indices (such as, heartbeat).

Any of the embodiments disclosed herein can be used in combination with any of the features disclosed in one or more of WO2010/061225, US2016/114074, US2006/0142560, and U.S. Pat. No. 5,703,225, which describe absorbent materials; WO2013/007973, which describes non-negative pressure wound dressings; GB1618298.2 (filed on 28 Oct. 2016), GB1621057.7 (filed on 12 Dec. 2016), and GB1709987.0 (filed on 22 Jun. 2017), which describe multi-layered wound dressings; EP2498829 and EP1718257, which describe wound dressings; WO2006/110527, U.S. Pat. No. 6,759,566, and US2002/0099318, which describe compression bandages; U.S. Pat. Nos. 8,235,955 and 7,753,894, which describe wound closure devices; WO2013/175306, WO2016/174048, US2015/0190286, US2011/0282309, and US2016/0339158, which describe negative pressure wound therapy dressings, wound dressing components, wound treatment apparatuses, and methods. The disclosure of each of these applications is hereby incorporated by reference in its entirety.

Substrate Supporting Sensors

A wound dressing that incorporates a number of electronic components, including one or more sensors, can be utilized in order to monitor characteristics of a wound. Collecting and analyzing data from a wound can provide useful insights towards determining whether a wound is on a healing trajectory, selecting proper therapy, determining whether the wound has healed, or the like.

Figure 1B:
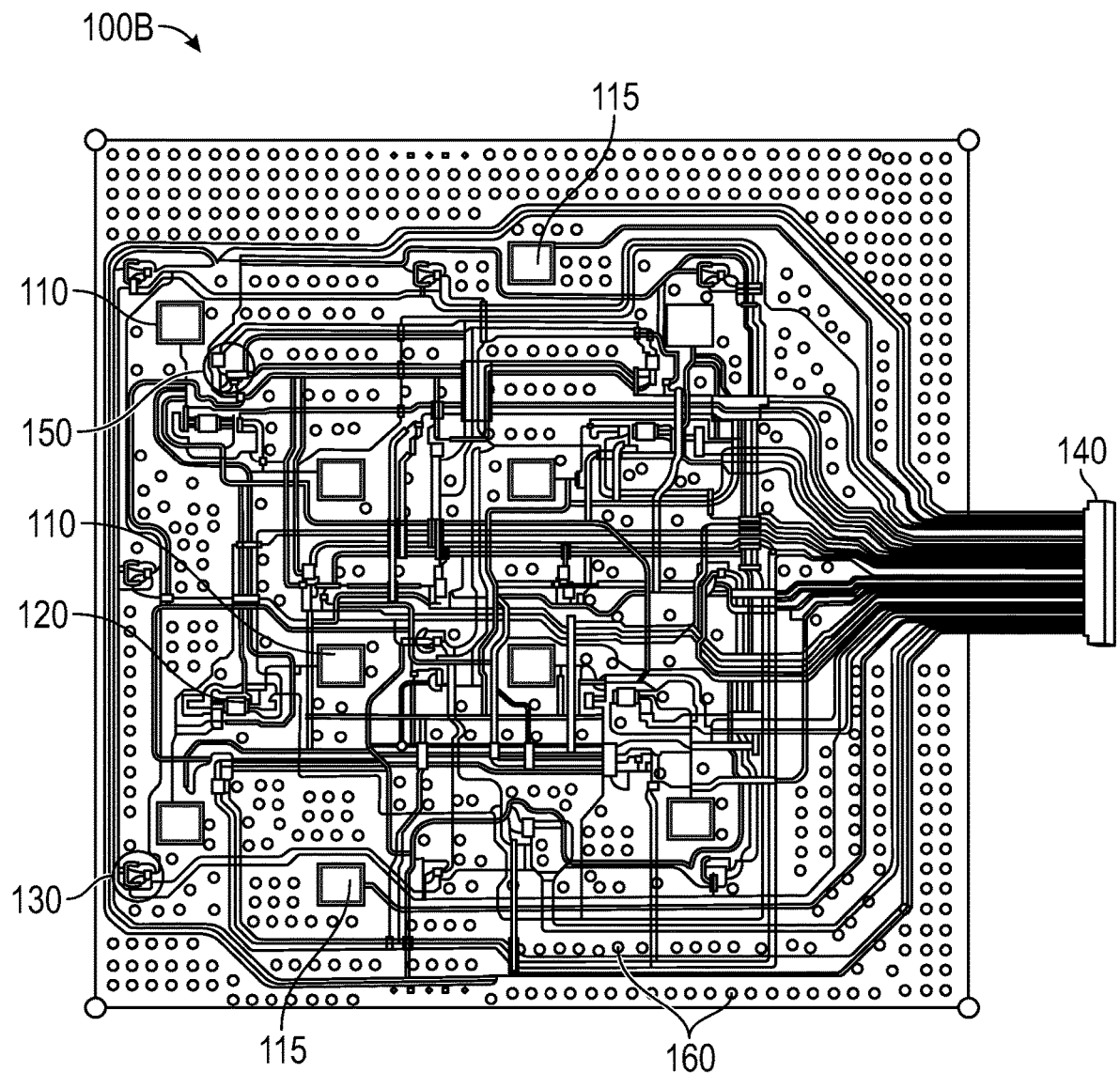
FIGS. 1B-1C illustrate perspective and top views of a perforated substrate supporting electronic components.
Figure 1C:
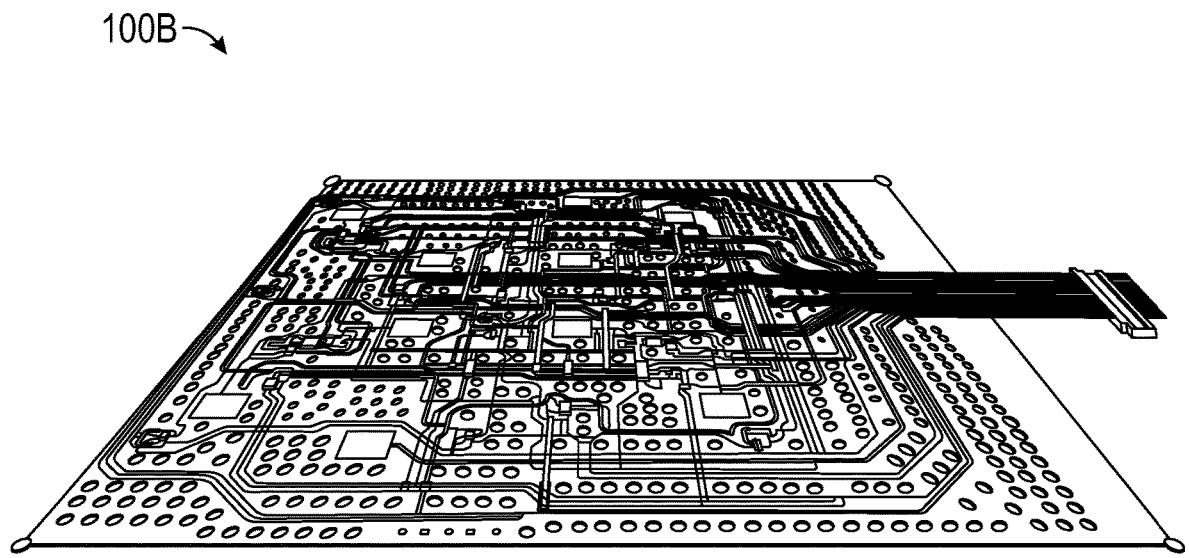

In some implementations, a number of sensor technologies can be used in wound dressings or one or more components forming part of an overall wound dressing apparatus. For example, as illustrated in FIGS. 1A-1C, one or more sensors can be incorporated onto or into a substrate (such substrate can be referred to as "sensor integrated substrate"). The substrate illustrated as having a square shape, but it will be appreciated that the substrate may have other shapes such as rectangular, circular, oval, etc. In some cases, a substrate supporting one or more sensors can be provided as an individual material layer that is placed directly or indirectly over or in a wound. The sensor integrated substrate can be part of a larger wound dressing apparatus. In some cases, the sensor integrated substrate is part of a single unit dressing. Additionally or alternatively, the sensor integrated substrate can be placed directly or indirectly over or in the wound and then covered by a secondary wound dressing, which can include one or more of gauze, foam or other wound packing material, a super-absorbent layer, a drape, a fully integrated dressing like the Pico or Allevyn Life dressing manufactured by Smith & Nephew, or the like.

The sensor integrated substrate can be placed in contact with a wound and can allow fluid to pass through the substrate while causing little to no damage to the tissue in the wound. The substrate can be flexible, elastic, extensible, or stretchable or substantially flexible, elastic, extensible, or stretchable in order to conform to or cover the wound. For example, the substrate can be made from a stretchable or substantially stretchable material, such as one or more of polyurethane, thermoplastic polyurethane (TPU), silicone, polycarbonate, polyethylene, polyimide, polyamide, polyester, polyethelene tetraphthalate (PET), polybutalene tetreaphthalate (PBT), polyethylene naphthalate (PEN), polyetherimide (PEI), along with various fluropolymers (FEP) and copolymers, or another suitable material.

In some cases, the substrate can include one or more flexible circuit boards, which can be formed of flexible polymers, including polyamide, polyimide (PI), polyester, polyethylene naphthalate (PEN), polyetherimide (PEI), along with various fluropolymers (FEP) and copolymers, or the like. One or more sensors can be incorporated into a two-layer flexible circuit. In some scenarios, the one or more circuit boards can be a multi-layer flexible circuit board.

In some cases, the sensor integrated substrate can incorporate adhesive, such as a wound contact layer as described herein, that adheres to wet or dry tissue. In some cases, one or more sensors, which can be positioned one or more flexible circuits, can be incorporated into any layer of the wound dressing. For example, a wound contact layer can have cutouts or slits that allow for one or more sensors to protrude out of the lower surface of the wound contact layer and contact the wound directly. In some situations, one or more sensors can be incorporated into or encapsulated within other components of a wound dressing, such as an absorbent layer.

As shown in FIG. 1A, a sensor integrated substrate 100A can support a plurality of electronic components and a plurality of electronic connections interconnecting at least some of the components. The electronic components can be one or more of any electronic components described herein, such as a sensor, amplifier, capacitor, resistor, inductor, controller, processor, or the like. The electronic connections can electrically connect one or more of the electronic components. The electronic connections can be tracks printed on the substrate, such as using copper, conductive ink (such as silver ink, graphite ink, etc.), or the like. At least some of the electronic connections can be flexible or stretchable or substantially flexible or stretchable.

The plurality of electronic components can include one or more impedance or conductivity sensors 110, which can be arranged in an outer 4×4 grid and an inner 4×4 grid as illustrated in FIGS. 1A-1C. Sensors 110 are illustrated as pads configured to measure impedance or conductivity of tissue across any pair of the pads. Two (or more) excitation pads 115 can be arranged as illustrated to provide the excitation signal across the pads, which is conducted by the tissue and responsive to which impedance or conductance of the tissue can be measured across the pads 110. Electrical components, such as one or more amplifiers 120, can be used to measure impedance or conductance of the tissue. Impedance or conductance measurements can be used to identify living and dead tissue, monitor progress of healing, or the like. The arrangement of the pads 110 in the inner and outer grids can be used to measure the impedance or conductance of the wound, perimeter of the wound, or tissue or areas surrounding the wound.

The plurality of electronic components can include one or more temperature sensors 130 configured to measure temperature of the wound or surrounding tissue. For example, nine temperature sensors arranged around the perimeter of the substrate 100A. One or more temperature sensors can include one or more thermocouples or thermistors. One or more temperature sensors can be calibrated and the data obtained from the one or more sensors can be processed to provide information about the wound environment. In some cases, an ambient sensor measuring ambient air temperature can also be used to assist in eliminating problems associated with environment temperature shifts.

The plurality of electronic components can include one or more optical sensors 150. One or more optical sensors 150 can be configured to measure wound appearance or image the wound. In some cases, a light source or illumination source that emits light and a light sensor or detector that detects light reflected by the wound are used as one or more optical sensors. The light source can be a light emitting diode (LED), such as one or more of white LED, red, green, blue (RGB) LED, ultraviolet (UV) LED, or the like. The light sensor can be one or more of an RGB sensor configured to detect color, infrared (IR) color sensor, UV sensor, or the like. In some cases, both the light source and detector would be pressed up against the skin, such that light would penetrate into the tissue and take on the spectral features of the tissue itself. In some scenarios, one or more optical sensor can include an imaging device, such as a charge-coupled device (CCD), CMOS image sensor, or the like.

In some cases, ultra bright LEDs, an RGB sensor, and polyester optical filters can be used as components of the one or more optical sensors to measure through tissue color differentiation. For example, because surface color can be measured from reflected light, a color can be measured from light which has passed through the tissue first for a given geometry. This can include color sensing from diffuse scattered light, from an LED in contact with the skin, or the like. In some cases, an LED can be used with a proximal RGB sensor to detect the light which has diffused through the tissue. The optical sensors can image with diffuse internal light or surface reflected light.

One or more of the plurality of electronic components can be controlled by a control module. The control module can receive and process one or more measurements obtained by the one or more sensors. An external control module can be connected to at least some of the plurality of electronic components via a connector 140. In some cases, the connector 140 can be positioned at the end of a conductive track portion as illustrated in FIG. 1B or attached to the conductive track portion at a position away from the end as illustrated in FIG. 1A or 1C (such as, attached to the top of the track portion with glue). The control module can include one or more controllers or microprocessors, memory, or the like. In some cases, one or more controllers can be positioned on the substrate, and the connector 140 is not used. In some cases, data and commands can be communicated wirelessly, such as by a transceiver positioned on the substrate, and the connector 140 is not used.

In some cases, additional or alternative sensors can be positioned on the substrate, such as one or more pH sensors, pressure sensors, perfusion sensors, or the like.

In some cases, a substrate can be perforated as illustrated in FIGS. 1B-1C. A plurality of perforations 160 can be formed in the substrate 100B, allowing fluid to pass through the substrate. It may be advantageous to use a perforated substrate in conjunction with application of negative pressure wound therapy, during which reduced pressure is applied to the wound covered by a dressing and which causes removal of fluid (such as wound exudate) from the wound. Perforations 160 can be formed around a plurality of electronic components and connections as illustrated in FIGS. 1B-1C. Perforations 160 can be formed as slits or holes. In some cases, perforations 160 can be small enough to help prevent tissue ingrowth while allowing fluid to pass through the substrate. In some cases, the perforations can be formed before or after the substrate is coated. In some cases, the perforations can be formed between any two coating steps described herein.

In some cases, any of the wound dressings or wound dressing components described herein can be part of a kit that also includes a negative pressure wound therapy device. One or more components of the kit, such as the sensor integrated substrate, secondary dressing, or the negative pressure wound therapy device can be sterile.

Any of the embodiments disclosed herein can be used with any of the embodiments described in International Patent Publication No. WO2017/195038, titled "SENSOR ENABLED WOUND MONITORING AND THERAPY APPARATUS," International Patent Publication No. WO2018/189265, titled "COMPONENT STRESS RELIEF FOR SENSOR ENABLED NEGATIVE PRESSURE WOUND THERAPY DRESSINGS," International Patent Application No. PCT/EP2018/069886, titled "SKEWING PADS FOR IMPEDANCE MEASUREMENT," and International Patent Application No. PCT/EP2018/075815, titled "SENSOR POSITIONING AND OPTICAL SENSING FOR SENSOR ENABLED WOUND THERAPY DRESSINGS AND SYSTEMS," each of which is incorporated by reference in its entirety.

Encapsulation and Stress Relief

In some cases, while it may be desirable for a substrate to be stretchable or substantially stretchable to better conform to or cover the wound, at least some of the electronic components or connections may not be stretchable or flexible. In such instances, undesirable or excessive localized strain or stress may be exerted on the one or more electronic components, such as on the supporting area or mountings of an electronic component, when the substrate is positioned in or over the wound. For example, such stress can be due to patient movement, changes in the shape or size of the wound (such as, due to its healing), or the like. Such stress may cause movement, dislodgment, or malfunction of the one or more electronic components or connections (for example, creation of an open circuit from a pin or another connector becoming disconnected). Alternatively or additionally, it may be desirable to maintain the position of one or more electronic components, such as one or more sensors, in the same or substantially same location or region with respect to the wound (such as, in contact with the wound) so that measurements collected by the one or more electronic components accurately capture changes over time in the same or substantially same location or region of the wound. While the surface of the stretchable substrate may move when, for example, the patient moves, it may be desirable to maintain same or substantially same locations of one or more electronic components relative to the wound.

To address these problems, in some cases, non-stretchable or substantially non-stretchable coating (such coating can sometimes be referred to as "hard coat") can be applied to one or more electronic components, one or more electronic connections, or the like. Hard coat can provide one or more of reinforcement or stress relief for one or more electronic components, one or more electronic connections, or the like. Hard coating can be formed from acrylated or modified urethane material. For example, hard coat can be one or more of Dymax 1901-M, Dymax 9001-E, Dymax 20351, Dymax 20558, Henkel Loctite 3211, or another suitable material. Hard coat can have viscosity from about 13,500 cP to 50,000 cP before being cured or from about 3,600 cP to about 6,600 cP before being cured. In some cases, hard coat can have viscosity of no more than about 50,000 cP. Hard coat can have hardness from about D40 to about D65 and/or linear shrinkage of about 1.5-2.5%.

In some cases, another coating (or coatings) can be applied to encapsulate or coat one or more of the substrate or components supported by the substrate, such as the electronic connections or the electronic components. Coating can provide biocompatibility, shield or protect the electronics from coming into contact with fluids, provide padding for the electronic components to increase patient comfort, or the like. As used herein, biocompatible can mean being in compliance with one or more applicable standards, such as ISO 10993 or USP Class VI. Such coating cam be sometimes referred to as "conformal coat" or "soft coat." Soft coat can be stretchable or substantially stretchable. Soft coat can be hydrophobic or substantially hydrophobic.

Soft coat can be formed from one or more suitable polymers, adhesives, such as 1072-M adhesive (for example Dymax 1072-M), 1165-M adhesive (such as, Dymax 1165-M), parylene (such as, Parylene C), silicones, epoxies, urethanes, acrylated urethanes, acrylated urethane alternatives (such as, Henkel Loctite 3381), or other suitable biocompatible and substantially stretchable materials. Soft coat can be thin coating, for example, from about 80 microns or less up to several millimeters or more. Soft coat can have hardness lower than about A100, A80, A50 or lower. Soft coat can have elongation at break higher than about 100%, 200%, 300% or more. Soft coat can have viscosity of about 8,000-14,500 centipoise (cP). In some cases, coating can have viscosity no less than about 3,000 cP. In some cases, coating can have viscosity less than about 3,000 cP.

Any of the hard or soft coats described herein can be applied by one or more of laminating, adhering, welding (for instance, ultrasonic welding), curing by one or more of light, UV, thermal (such as, heat), or the like. Any of the hard or soft coat described herein can be transparent or substantially transparent to facilitate optical sensing. Any of the coatings described herein can retain bond strength when subjected to sterilization, such as EtO sterilization. Any of the coatings described herein can be modified to fluoresce, such as under UV light.

Figure 2A:
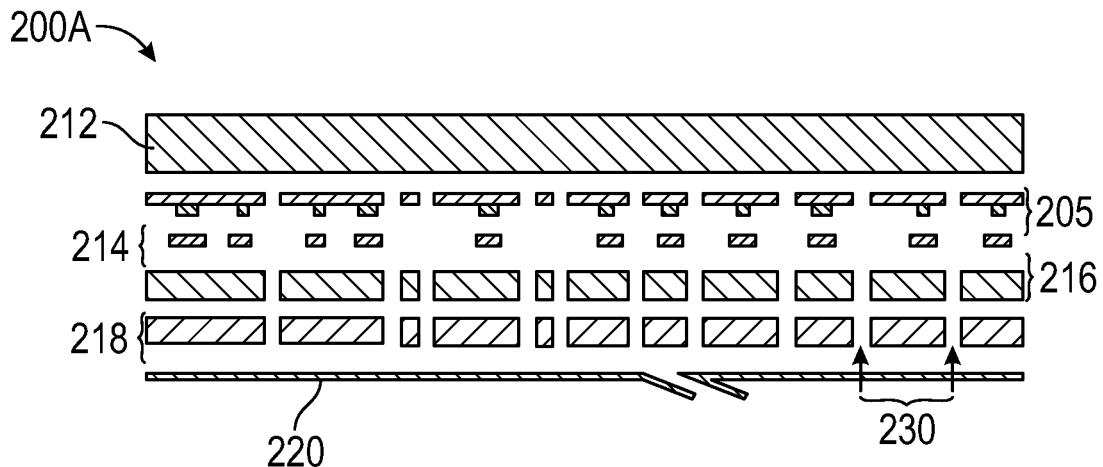
FIGS. 2A-2B illustrates cross-sections of wound dressings.
Figure 2B:
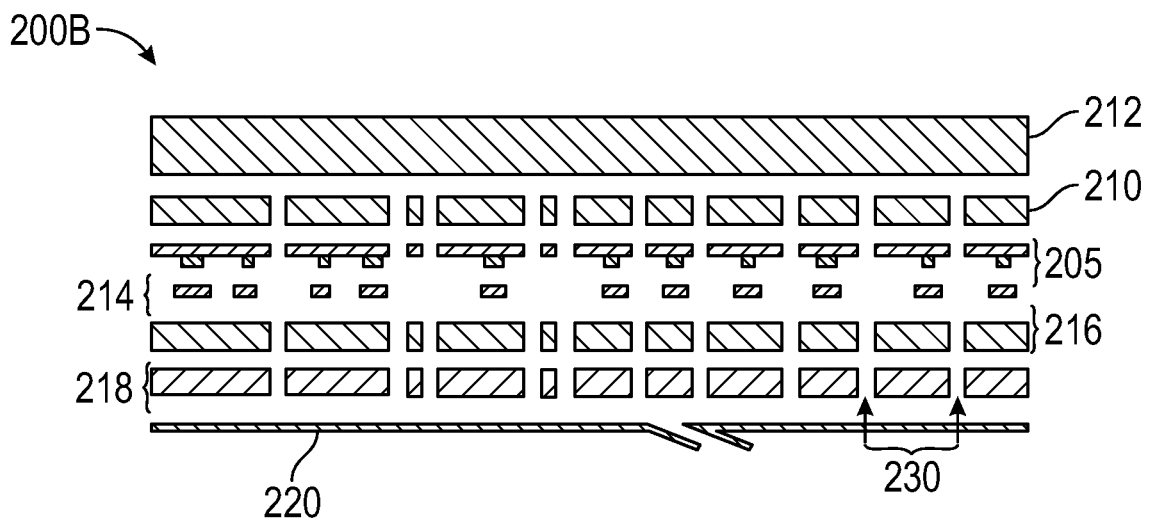

FIGS. 2A-2B illustrate cross-sections of wound dressings that include sensor integrated substrates. Dressing 200A shown in FIG. 2A can include a sensor integrated substrate 205 supporting a plurality of electronic components (shown as protruding from the substrate) and a plurality of electronic connections, as described herein. The dressing 200A can include hard coat 214, applied to one or more electronic components or connections. In some cases, hard coat can be applied to areas where electronic components are connected to electronic connections. This can reinforce these connections. In some cases, hard coat can be applied to each of the one or more of the electronic components or connections.

The dressing 200A can include soft coat 216, which can be applied to the entire wound facing side of the substrate. Soft coat 216 can be applied to an entire or substantially entire area of the wound facing side of the substrate to encapsulate the substrate, electronic components, and connections. In some cases, soft coat 216 can be applied to certain regions of the substrate, such as those regions supporting one or more of electronic components or connections.

The dressing 200A can include a wound contact layer 218. The wound contact layer 218 can include adhesive material configured to adhere the substrate to the wound, which can facilitate maintaining contact of one or more sensors with the wound. The wound contact layer 218 can be formed from silicone. The silicone material can be low tac (or tack) silicone. The wound contact layer 218 can include silicone adhesive mounted on a film. In some cases, the wound contact layer 218 can be similar to the material used in Allevyn Life Non-Bordered dressing manufactured by Smith & Nephew.

The wound contact layer 218 can be applied to an entire or substantially entire area of the wound facing side of the substrate. In some cases, the wound contact layer 218 can be applied to certain regions of the substrate, such as those regions supporting one or more of electronic components or connections.

As illustrated in FIG. 2A, a plurality of perforations 230 can be formed through one or more of the substrate, hard coat, soft coat, and wound contact layer. As described herein, perforations can be made in regions or areas of the substrate that do not support electronic components or connections. The perforations can be formed after application of all layers, between application of any two layers, or can be formed in several pieces individually before the layers are applied to each other. For example, in some cases, the substrate can be perforated after application of the hard coat 214 and soft coat 216 but before the application of the wound contact layer 218 or wicking layer 212 (described below).

The dressing 200A can include a protective layer 220 applied to the wound contact layer 218. The protective layer 220 can be made of paper, such as laminated paper. The protective layer 220 can protect the wound contact layer 218 prior to use and facilitate easy application for a user. The protective layer 218 can include a plurality (such as two) handles. The handles can be applied in a folded configuration, in which a slit separating the handles is covered by one of handles folded over the slit. In some cases, the protective layer 220 can be similar to the protective layer used in the Allevyn Life Non-Bordered dressing.

As illustrated, a wicking layer 212 can be positioned over an opposite, non-wound facing side of the substrate. The wicking layer 212 can facilitate passage of fluid through the layers below the wicking layer. For example, the wicking layer can transport (or "wick") fluid away from the lower layers, such as from the substrate, toward one or more upper layers positioned over the wicking layer 212. Such one or more upper layers can include one or more absorbent materials as described herein. In some cases, the wicking layer 212 is formed from foam, such as foam similar to that used in the Allevyn Life Non-Bordered dressing. The wicking layer can be extensible or substantially extensible.

As illustrated in the dressing 200B of FIG. 2B, additional layer of soft coat 210 can be positioned over the non-wound facing side of the substrate between the substrate and the wicking layer 212. For example, soft coat 210 can protect the non-wound facing side of the substrate from fluid if the substrate is formed from material that is not impermeable to fluid. In such case, soft coat 210 can be hydrophobic or substantially hydrophobic. Soft coat 210 can be made of the same or different material than soft coat 218. Soft coat 210 can be perforated as illustrated and described. In some cases, soft coat can encapsulate the entire substrate, including both the wound facing and non-wound facing sides.

Figure 3A:
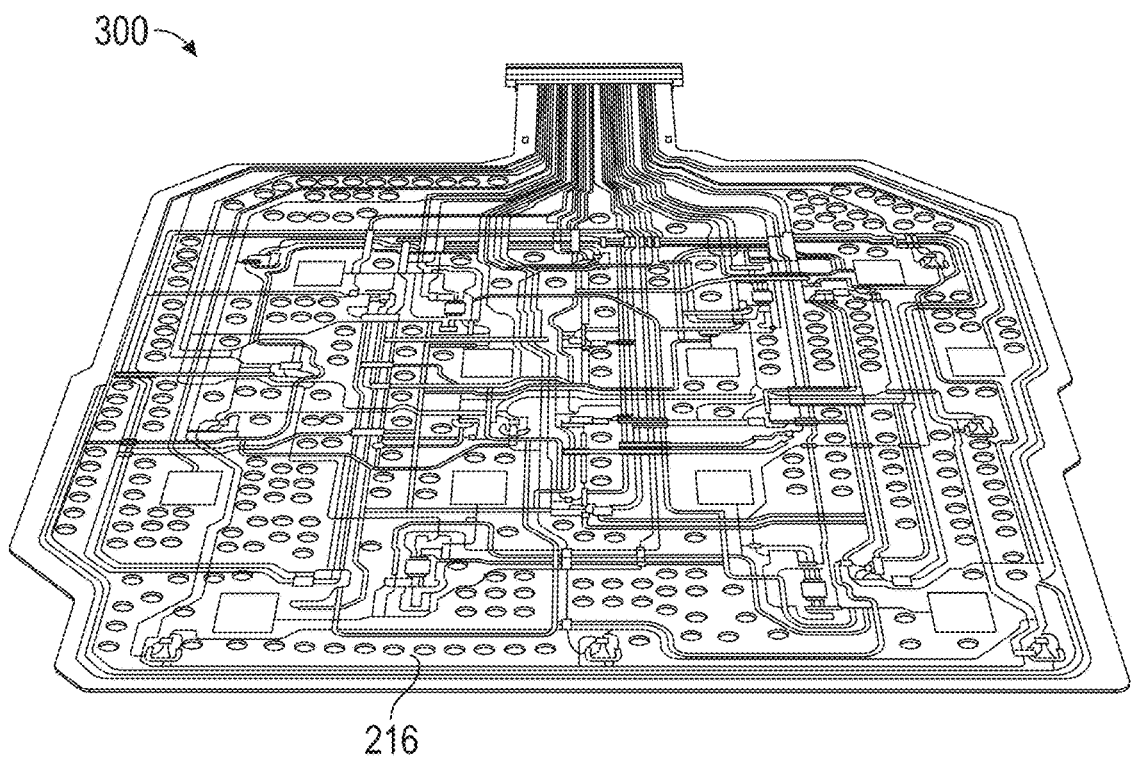
FIGS. 3A-3B illustrate perspective and top views of a perforated substrate supporting electronic components.
Figure 3B:
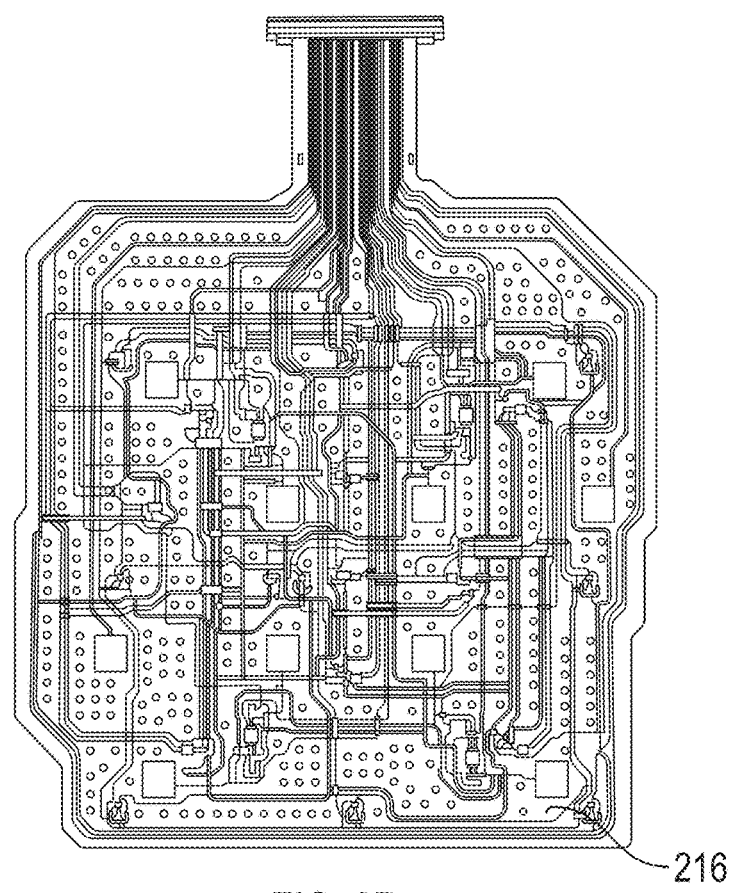

FIGS. 3A-3B illustrate coated sensor integrated substrates 300. The substrates 300 are illustrated with non-wound facing side 216 up. The substrates 300 can be similar to any of the substrates described herein.

Any of the embodiments disclosed herein can be used with any of the embodiments described in International Patent Application No. PCT/EP2018/069883, filed Jul. 23, 2018 titled "BIOCOMPATIBLE ENCAPSULATION AND COMPONENT STRESS RELIEF FOR SENSOR ENABLED NEGATIVE PRESSURE WOUND THERAPY DRESSINGS" and International Patent Application No. PCT/EP2018/078374, filed Oct. 17, 2018, titled "FLUID MANAGEMENT FOR SENSOR ENABLED WOUND THERAPY DRESSINGS AND SYSTEMS," which is incorporated by reference in its entirety.

Manufacturing of Encapsulation and Stress Relief

The dressing including the substrate or components supported by the substrate, such as the electronic connections or the electronic components, can be manufactured to create the multilayer dressing construction described herein.

Figure 4:
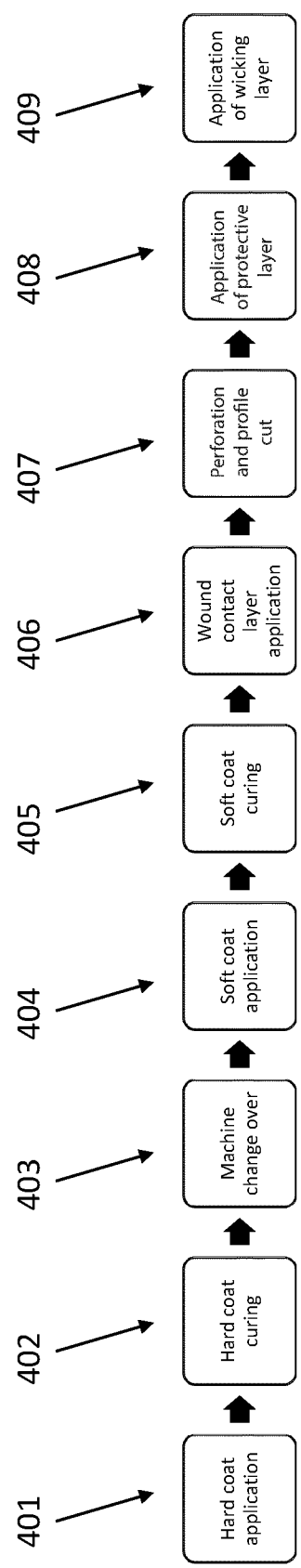
FIG. 4 shows a flowchart illustrating the process of manufacturing the dressing including the substrate or components supported by the substrate.

FIG. 4 shows a flowchart illustrating the process of manufacturing the dressing including the substrate or components supported by the substrate. First, the hard coat can be applied to the substrate or components of the substrate 401.

A coating apparatus is used to coat the substrate with the hard coat. The substrate can have a first, wound facing side that supports the electronic connections or electronic components and an opposite, non-wound facing, second side. As described herein the first side of the substrate can be the wound facing side of substrate when the substrate is positioned over a wound and the second side of the substrate can be a side of the substrate opposite the first side of the substrate or a non-wound facing side of the substrate.

Figure 5B:
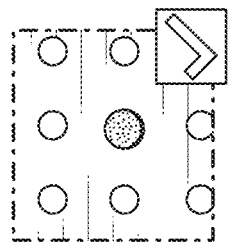
FIG. 5A-5B illustrates a substrate with registration marks.
Figure 5B:
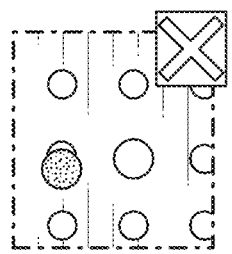
Figure 5A:
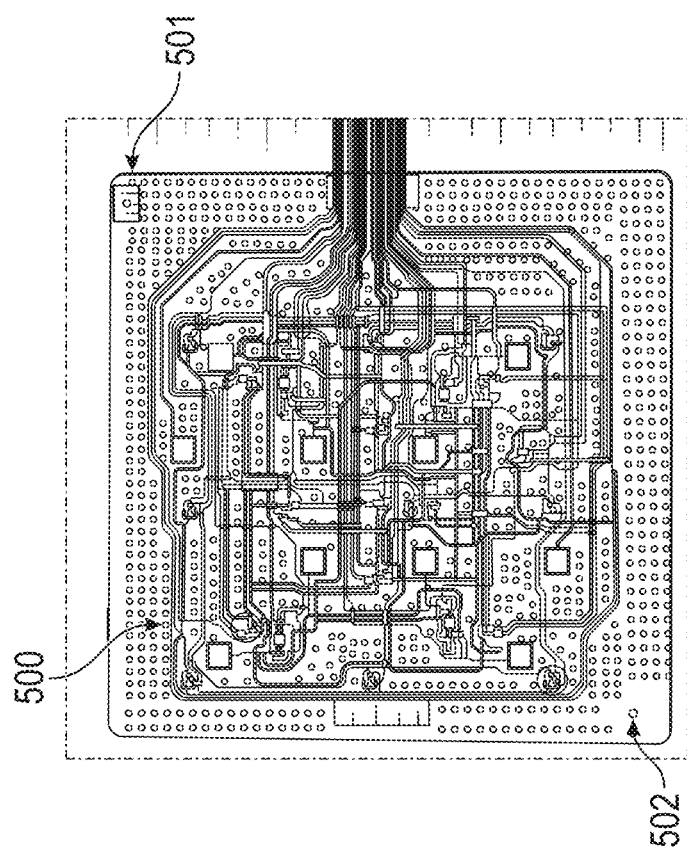

As described herein with reference to FIGS. 2A-2B the hard coat can be applied to the first side of the substrate. The coating apparatus can be machine programed to coat the substrate. For example, a robotic machine can be used and the robotic machine can be preprogramed to perform the manufacturing steps described herein. To obtain proper alignment of the substrate with the coating apparatus registration marks can be used on the substrate. The registration marks can be on any portion of the substrate. In some cases, the registration marks can be on the top right 501 and bottom left 502 of the substrate 500 as illustrated in FIG. 5A. While the registration marks in FIG. 5A are shown in specific location, they can be on any portion of the substrate 500 that allows for alignment of the substrate 500. The registration mark can be a datum point as illustrated in FIG. 5B and/or any marking on the substrate. The registration mark can be aligned with a marking on the coating apparatus and/or can be optically detected by the coating apparatus with a camera or other device on the coating apparatus. The coating apparatus can use a camera or other optical system to confirm alignment of the registration marks on the coating apparatus. The substrate is positioned on the coating apparatus with the electronic connections or the electronic components (first side) facing toward the nozzle or dispenser of the coating apparatus that dispenses the coating. The proper alignment of the substrate using the registration marks can confirm that the coating apparatus is coating the substrate at the location of the desired electronic connections or the electronic components while leaving other regions of the first surface of the substrate free from coating.

Once the substrate is properly aligned on the machine the coating apparatus can utilize a vacuum device that holds the substrate on the apparatus in the proper alignment during the coating process. For example, the coating device can have a plate for receiving the substrate and that plate can include holes. The vacuum can be drawn from the side of the plate opposite the side of the plate that the substrate rests on and the holes can allow the vacuum to secure the substrate to the plate. Once the substrate is properly aligned and secured, the coating apparatus can dispense the hard coat on the components and/or the component connector (or track interfaces) on the substrate.

As shown in FIG. 4, once the necessary regions of the substrate are coated with the hard coat, the hard coat can then be cured 402. The coated substrate with the electronic connections or the electronic components can be exposed to a UV light or other curing light source. For example, the substrate can be placed in a UV oven to cure the coating to the substrate. The coating can be cured according to the specifications described herein with reference to FIGS. 2A-2B.

After curing of the hard coat, the substrate can be prepared for further coating and processing. In some cases, the substrate with the cured hard coat can be placed on the same coating apparatus or machine that processed the hard coat. The substrate with the cured hard coat can be maintained on the same machine for processing and application of the soft coat on the substrate. The coating apparatus can be changed over to accommodate coating of the soft coat to the substrate 403. The hard coat dispending head and associated cables, control mechanisms, and air supply can be replaced with a soft coat spray head and its associated cables, control mechanisms, and air supply. In other cases, the substrate with the cured hard coat can be placed on another machine to process the soft coat application. In such cases, the machine change over step may not need to be performed during manufacturing of the dressing.

The soft coat can then be applied to the substrate or components of the substrate 404. The substrate can be placed on the coating apparatus such that the electronic connections or the electronic components face toward the nozzle or dispenser of the coating apparatus that dispenses the coating. The edges or registration marks on the substrate can be aligned as described previously on the plate of the apparatus. As described previously, the plate that supports the substrate on the apparatus can have holes or perforations that allow a vacuum to be applied to the substrate. Once the substrate is positioned correctly, the vacuum can be applied to the perforated plate on a side opposite the side of the perforated plate that the substrate rests on to hold the substrate in place on the plate. The soft coat is then applied by the coating apparatus to the first side of the substrate. As described above, the soft coat can be applied to an entire or substantially entire area of the first side (or wound facing side) of the substrate to encapsulate the substrate, electronic components, and connections. Accordingly, the soft coat can be applied over the hard coat previously applied to the first side of the substrate.

After application of the soft coat, as shown in FIG. 4, the soft coat can be cured 405. The coated substrate with the electronic connections or the electronic components can be exposed to a UV light or other curing light source. For example, the substrate can be placed in a UV oven to cure the coating to the substrate. The coated substrate can be removed from the coating apparatus to be placed in a UV oven or other curing machinery. As the coated substrate is removed from the coating apparatus and the perforated plate, care is taken to ensure the adhesive is not touched or disturbed.

In some cases, a second side of the substrate can be coated with a soft coat as described in FIG. 2B. The same steps described with reference to coating the first side of the substrate can be used to coat the second side of the substrate. In some cases, jigs or plates can be created to hold the substrate while the second side of the substrate is being coated. For example, a jig that contains recesses for receiving the electronic components or electronic connections can be used as described in UK Application No. 1816838.5, filed on Oct. 16, 2018, entitled SYSTEMS AND METHOD FOR APPLYING BIOCOMPATIBLE ENCAPSULATION TO SENSOR ENABLED WOUND MONITORING AND THERAPY DRESSINGS, which is incorporated by reference in its entirety.

Once the hard coat and soft coat are applied to the substrate, a wound contact layer can be applied to the coated substrate 406. The wound contact layer can be adhered to the first side of the coated substrate. The wound contact layer can be adhered to the soft coat coating the first side of the substrate.

The coated substrate can be placed on a flat surface with the components supported by the substrate, such as the electronic connections or the electronic components, facing upward. The wound contact layer material can be cut to the size of the substrate. In some cases, the size of the wound contact layer can be approximately the same dimensions as the substrate. In some cases, the wound contact layer can have a dimension that is smaller than a dimension of the substrate and an edge of the substrate can extend beyond an edge of the wound contact layer. In other cases, the wound contact layer can have a dimension that is larger than a dimension of the substrate. In such cases, an edge of the wound contact layer can extend beyond an edge of the substrate. A carrier layer can be removed from the adhesive surface of the wound contact material and the wound contact layer can be adhered centrally over the substrate. Any liner or carrier layer on the side of the wound contact layer opposite the side sealed to the soft coat of the first side of the substrate can be removed and any excess wound contact layer material from the border of the sample can be removed or cut away.

Figure 6:
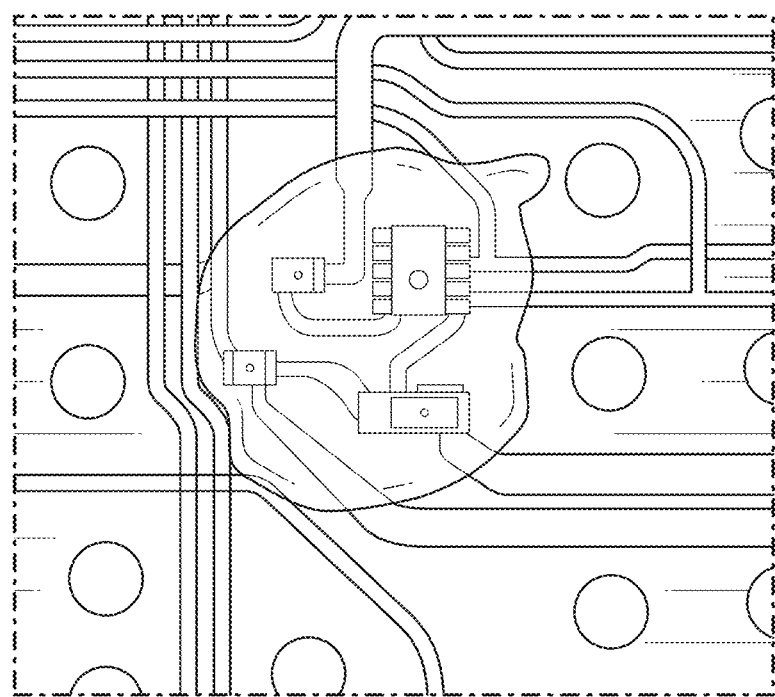
FIG. 6 illustrates a portion of the substrate covered with a wound contact layer.

In some cases, the coated component areas on the substrate can create raised regions due to the height of the component and/or the multiple layers of coatings on these areas. When the wound contact layer is applied to the coated substrate, the wound contact layer can form air bubbles or void spaces around the coated and raised components on the substrate as illustrated in FIG. 6. This can be caused by laying a flat wound contact layer over a raised component causing air to be trapped under the flat wound contact layer. The air bubbles can interfere with sensor performance, cause delamination between the film and the coated substrate and/or electronic components, and create a small air chamber where sterilization techniques, including sterilization gas, may not be able to penetrate and properly sterilize the device, which could be an infection risk if the air bubble is ruptured.

In some cases, the air bubbles can be smoothed out toward components. In some cases, a small prick or hole can be made in the wound contact layer material after application of the wound contact layer to the soft coat to expel trapped air around components. In such cases, care must be taken to ensure the components or coated substrate is not contacted or damaged.

In some cases, the wound contact layer can be pre-cut with small holes or slits in the wound contact layer material that align with the location of the electronic components or raised features on the substrate. In some cases, small holes or slits in the wound contact layer could be achieved using a laser cutter or clicker press. The holes or slits can be slightly larger than the circumference or outer perimeter of the electronic components or raised features. This can ensure that the majority of the substrate remains covered by the wound contact layer. The wound contact layer can be applied such that the electronic components or raised features of the substrate protrude through the holes or slits in the wound contact layer to prevent the air from being trapped under the wound contact layer. In some cases, a wound contact layer is not applied to the first side or electronics side of the coated substrate. In such cases, the first side or electronics supporting side of the coated substrate can be in contact with the skin or wound area. For example, the soft coat on the first side or electronics supporting side of the coated substrate can be in contact with the skin or wound area.

As shown in FIG. 4, after the wound contact layer is applied to the substrate, the dressing can be laser perforated and profile cut 407. The substrate is placed on a cutting apparatus (or the previous apparatus used for coating the substrate can also be used for cutting). The substrate can be positioned on a cutting jig with the wound contact layer facing upward or away from the jig. For example, the substrate can be placed on the jig or plate so that the side of the substrate opposite the side with the wound contact layer (the second side of the substrate) can be in communication with the jig or plate. The jig can include one or more support struts for supporting portions of the substrate that will not be cut by the cutter. In some cases, the substrate can be cut with a laser on a laser cutting bed. In other cases, the substrate can be cut with any cutting apparatus to perforate the dressing. The substrate can be suspended on the cutting apparatus to aid cutting and perforation of the substrate. When perforating the substrate, the substrate can rest on a metal honeycomb structure of support struts. However, where the perforation area of the dressing aligns with the metal surfaces during perforation, the metal surface can prevent a slug of material punched out from the perforation from being ejected from the new perforation. These slugs can be left stuck to the substrate in the form of loose, tacky debris. This can cause several safety issues as there is a risk of debris falling from the product into the wound bed. In some cases, the slugs can remain inside the perforations, this can cause performance issues which could lead to patient safety issues such as maceration caused by excessive amounts of fluid remaining in contact with the wound for an extended period.

Figure 7A:
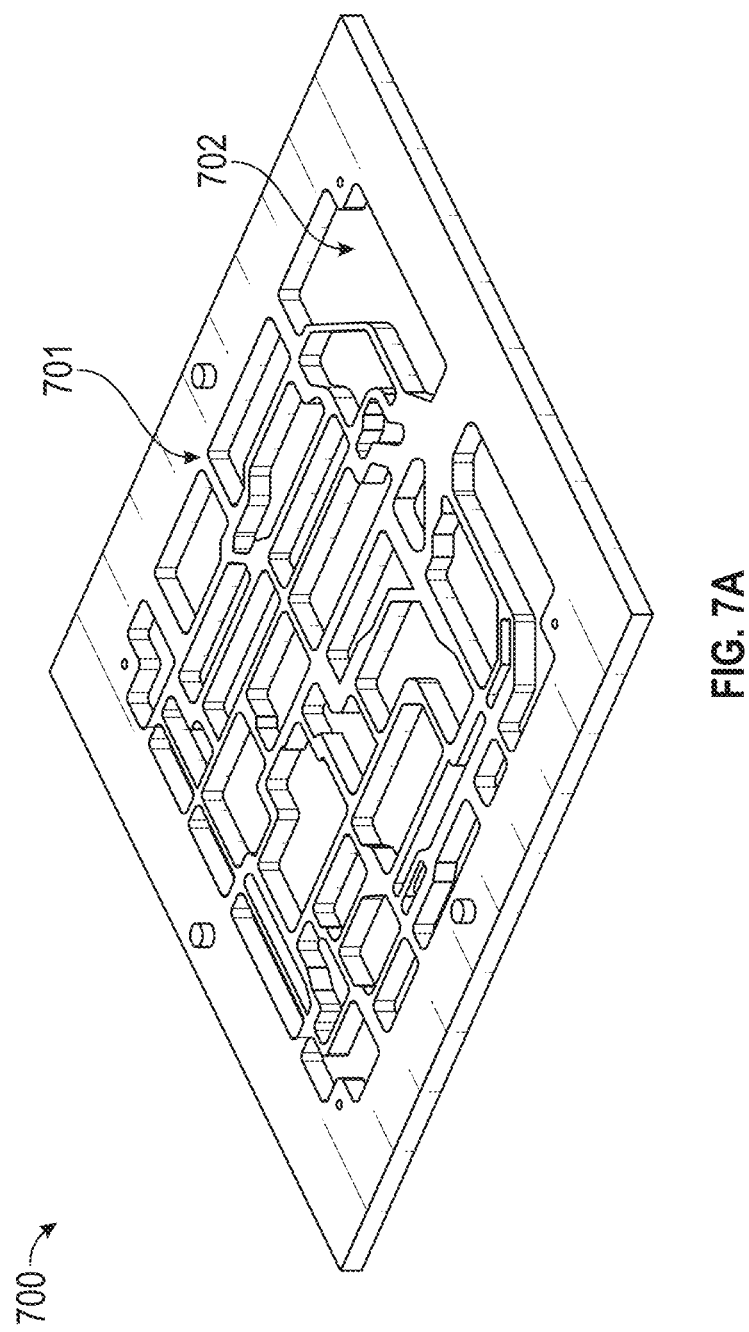
Figure 7D:
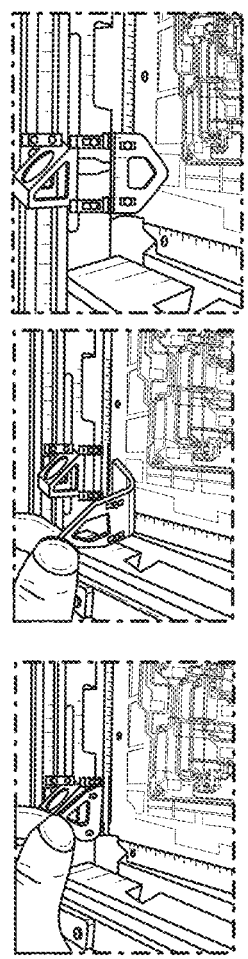
Figure 7C:
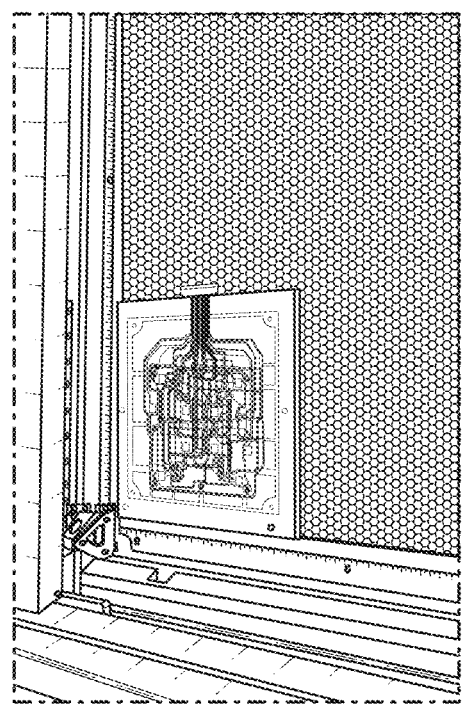

To reduce the interference of the metal honeycomb structure of the support struts with the perforation areas, the jig structure can be designed with areas of the substrate which are to be perforated over 'fresh air', i.e. lift the substrate off the honeycomb cutting bed and support it on the areas where no perforations are to take place. This could be by clamping around the edges and holding the substrate taught. Other examples include, designing a jig which allows the substrate to rest on support struts of the jig that are aligned with the areas of the substrate corresponding to electronic components or electronic connections. This design of the support struts can leave the areas of the dressing to be perforated suspended over fresh air. Examples of a jig which rests the areas of the substrate corresponding to electronic components or electronic connections on the support struts of the jig are shown in FIGS. 7A-7D. FIGS. 7A and 7B illustrate multiple views of a jig 700 that rests the areas of the substrate corresponding to electronic components or electronic connections on the support struts 701. This design of the support struts 701 can leave the areas to be perforated suspended over fresh air or holes 702 in the jig surface as shown in FIG. 7A-7B. FIGS. 7C-7D illustrate the jig of FIGS. 7A and 7B with the substrate supported by the jig. The jig that includes support struts that correspond to the electronic components or electronic connections of the substrate can make the perforation process cleaner with few slugs remaining in the perforations.

In some cases, registration marks on the substrate can be used to align the dressing with the jig of the cutting apparatus. The registration marks on the dressing can be aligned with markings or circles provided on the jig for proper alignment. The registration marks can be similar to the registration marks described with reference to FIGS. 5A-5B. In some cases, registration marks or other alignment indicia on the substrate can be aligned with a marking or indicia on a jig or the cutting apparatus itself. The registration marks or other alignment indicia on the substrate can be optically detected by a camera or other optical device to confirm proper placement on the jig or cutting apparatus. The apparatus can use a camera or other optical system to confirm alignment of the registration marks on the substrate. If the registration marks or other alignment indicia on the substrate are optically aligned with the jig, the jig and substrate can be transferred to the cutting apparatus and the perforations and/or cutting can begin.

Aligning the registration marks of the substrate with the corresponding markings on the jig can allow for proper alignment of the substrate on the jig such that the support struts on the jig line up with the areas of the substrate that contain the electronic connections or the electronic components. The support struts on the jig can line up with the layout of the tracks of the electronic connections as illustrated in FIG. 7C. As illustrated in FIG. 7C, the jig and the substrate are placed in the cutter bed. The cutting profile can be preset and uploaded to the cutting apparatus. The preset cutting profile can allow for the cutting apparatus to perforate the dressing at locations where there are not electronic connections or electronic components. As illustrated in FIG. 7D, the cutting apparatus can be positioned at an optimal distance from the dressing and the cutting apparatus can begin cutting in the preset or predetermined cut pattern. The cutting apparatus can be a laser cutter or any other cutting device that can make precision cuts in the dressing material. Once the cutting pattern is complete, the dressing can be removed and any waste can be cut off.

The dressing including the substrate requires perforation to create through holes through the wound contact layer and the substrate coated with the first and second coating in order to allow fluid to pass through the wound contact layer and the substrate and away from the wound. However, due to the complex electronic connections and electronic components on the substrate, a precise method of perforation can be necessary. The cutting apparatus can perform custom or irregular cutting patterns that are preprogramed on the cutting apparatus. The custom cutting pattern of the cutting apparatus can be useful due to the nature of the device and the close proximity to critical areas which need perforation. Methods of perforation such as hole punching and ultrasonic perforation can be used to create the perforations on the dressing. Additionally or alternatively, laser cutting can be used to form the perforations. In some cases, the perforations can be applied through the coated substrate prior to attaching the wound contact layer or if no wound contact layer is used.

The custom cutting pattern which corresponds to the layout of the electronic components and connections on the substrate can be produced on a software package and the pattern sent to a cutting system. For example, a file can be created that identifies the appropriate places for perforations so that they do not interfere with the electronic components and connection of the substrate. That file can then be sent to the cutting apparatus to perform the cut.

Cutting through the dressing once it has been coated can cause difficulty when processing. The dressing can have a tendency to roll up on itself and stick to itself, making it extremely difficult to locate on the cutting jig. A support liner can be used to provide rigidity to the dressing during further processing steps. If it is only necessary to coat the first side of the substrate and not the reverse second side, the support liner can be applied to the substrate before any processing and can remain on the second side of the substrate throughout processing of the first side of the substrate (i.e. the support liner will be left on the side of the substrate opposite the electronics during coating, during application of the wound contact layer, and during perforation).

If both sides of the substrate need to be coated, before the second side of the substrate is coated, the support liner can be removed from the second side of the substrate and the second side of the substrate can be coated as described herein with reference to FIG. 2B. After coating of the second side of the substrate, the support liner can be placed on the substrate after the coating steps when the substrate is still flat on the coating apparatus. The liner can be placed onto the back of the substrate to provide it with the necessary support and rigidity to process in the cutting apparatus as described herein. The liner can be applied while the substrate is still on the coating jig and held in a flat position. This can help align the substrate on the support liner since the substrate is held in a flat position. Proper alignment of the support liner with the substrate can ensure the cutting pattern will not interfere with the electronics (this may happen if the sample is placed on the liner with creases). Once the substrate is perforated, the support liner can be removed and discarded.

The support liner can make the substrate easier to handle during perforation. The perforation process for the substrate can be quicker and more accurate than samples of substrate perforated without the support liner. This can lead to fewer wasted or defective substrates as it allows for proper placement and the components are less likely to be destroyed during the perforation process.

The cutting apparatus can form holes through the substrate using cut patterns other than the perforation patterns described herein. The cut patterns can be cut outs of large areas of the dressing. As described herein, the substrate can require a mode of transportation of fluid from the wound to a dressing which will be placed above the wound or transportation of fluids from one side of the substrate to the other. This mode of transportation of fluid can be achieved by perforating the dressing using circular perforations similar to the circular perforations in wound contact layers for fully integrated dressing like the Pico or Allevyn Life dressing manufactured by Smith & Nephew, or the like.

In some cases, the circular perforations can be problematic when a wound contact layer is laminated to the substrate as there can be some adverse effects of perforating through the wound contact layer. For example, there can be adverse effects when a laser is used to perforate the dressing and the wound contact layer includes silicone. For example, the adverse effects can include charring of the silicone around the edge of a perforation, discoloration of the silicone, and/or a tendency for flare ups to occur on the surface when being laser cut.

The holes in the dressing can be created in other ways to allow transportation of fluid through the dressing when the dressing is placed over a wound. For example, large sections of the substrate can be cut out and then a pre-perforated wound contact layer can be added or applied to the first surface of the substrate. The wound contact layer can be perforated with a method other than laser cutting. This method can allow the wound contact layer to be added to the device without the need to laser through the wound contact layer material.

Figure 8:
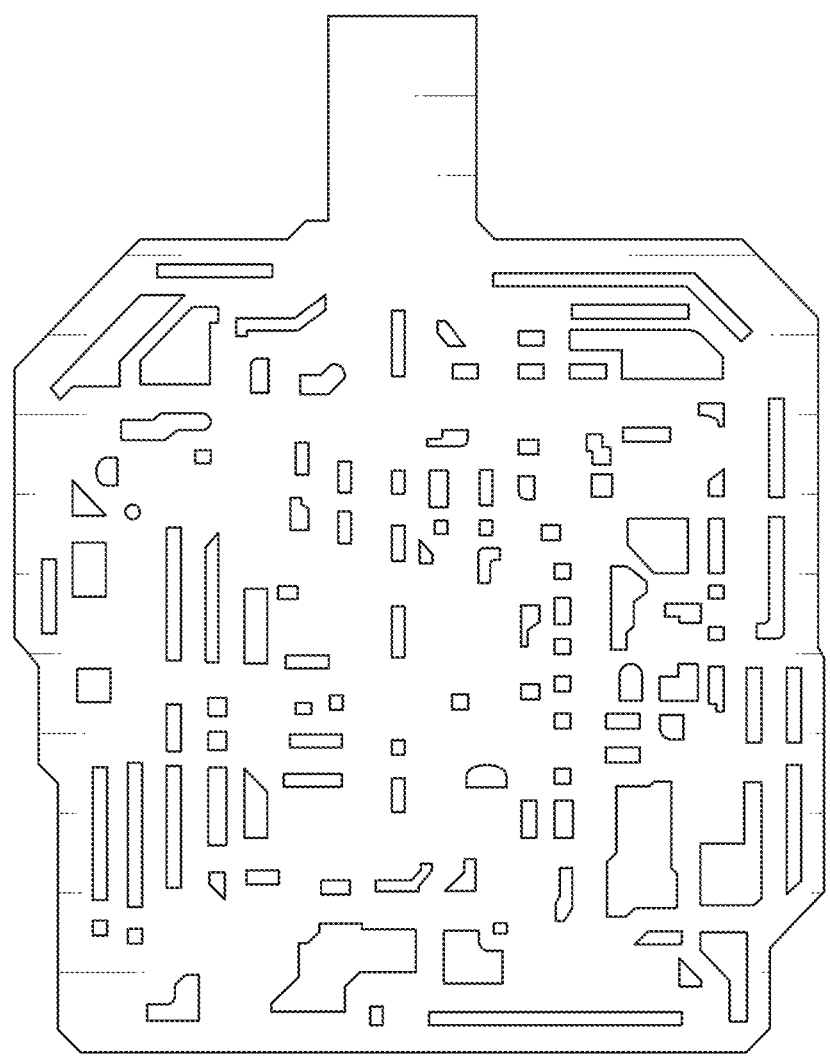
FIG. 8 illustrates a substrate with cut out areas in the substrate.

FIG. 8 illustrates a substrate with cut out areas in the substrate. A pattern as illustrated in FIG. 8 can be cut into the substrate using the cutting apparatus. The cutting apparatus cuts away any sections of the substrate which do not contain electronic connections or electronic components. The area cut out of the substrate can leave approximately 0.1 mm from the edge of the cut to the nearest electronic connection or electronic component. The area cut out of the substrate can leave approximately less than 0.05 mm (less than about 0.05 mm), 0.05 mm-0.1 mm (about 0.05 mm-0.1 mm), 0.1 mm to 0.15 mm (about 0.1 mm to 0.15 mm), or greater than 0.15 m (greater than about 0.15 mm) from the edge of the cut to the nearest electronic connection or electronic component.

Figure 9:
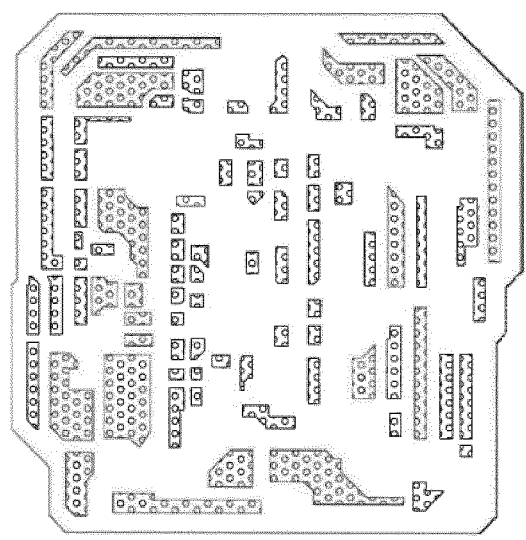
FIG. 9 illustrates a pre-perforated wound contact layer applied to the substrate with large cut outs shown in FIG. 8.

Once the cutting apparatus has cut the pattern into the substrate, a pre-perforated wound contact layer is applied to the first surface of the substrate as described herein. The wound contact layer can have a uniform perforation pattern distributed through the layer. In some cases, the wound contact layer can have a random or non-uniform perforation pattern. FIG. 9 illustrates a pre-perforated wound contact layer applied to the substrate with large cut outs shown in FIG. 8. Additionally, this method of applying a pre-perforated wound contact layer can prevent air bubbles from becoming trapped between the wound contact layer and the coated substrate as described herein.

As shown in FIG. 4, once the dressing (including the coated substrate and the wound contact layer) is perforated a protective layer can then be applied 408 to the perforated dressing. The substrate can be placed on a flat surface with the wound contact layer facing uppermost. Any protective liner on the wound contact layer can be removed exposing the wound contact layer. In some case, when the wound contact layer is not used, the protective layer can be applied to the first side of the substrate.

Figure 10:
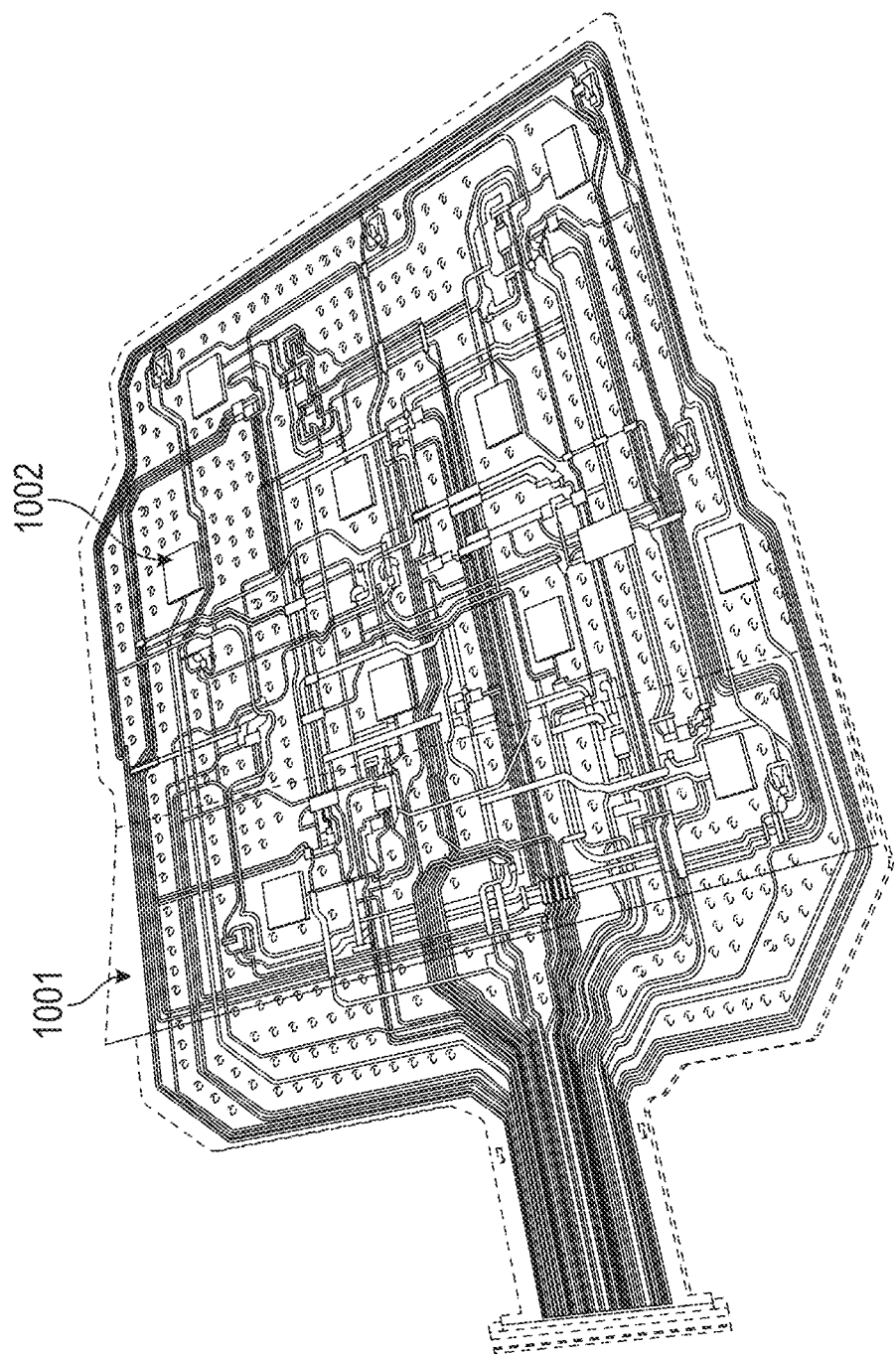
FIG. 10 illustrates a dressing with a delivery material that includes handles.

FIG. 10 illustrates a dressing with the protective layer 1002. The protective layer 1002 can be made of paper, such as laminated paper. The protective layer 1002 can protect the wound contact layer and/or substrate prior to use and facilitate easy application for a user. The protective layer 1002 can include a plurality (such as two) handles 1001. The handles can be applied in a folded configuration, in which a slit separating the handles is covered by one of handles folded over the slit. In some cases, the protective layer 1002 can be similar to the protective layer used in the Allevyn Life Non-Bordered dressing. The handle 1001 can be folded and placed on the exposed surface of wound contact layer and/or substrate as illustrated in FIG. 10. Any excess protective liner material can be cut away to match the profile of the substrate which was cut with the cutter.

Figure 11:
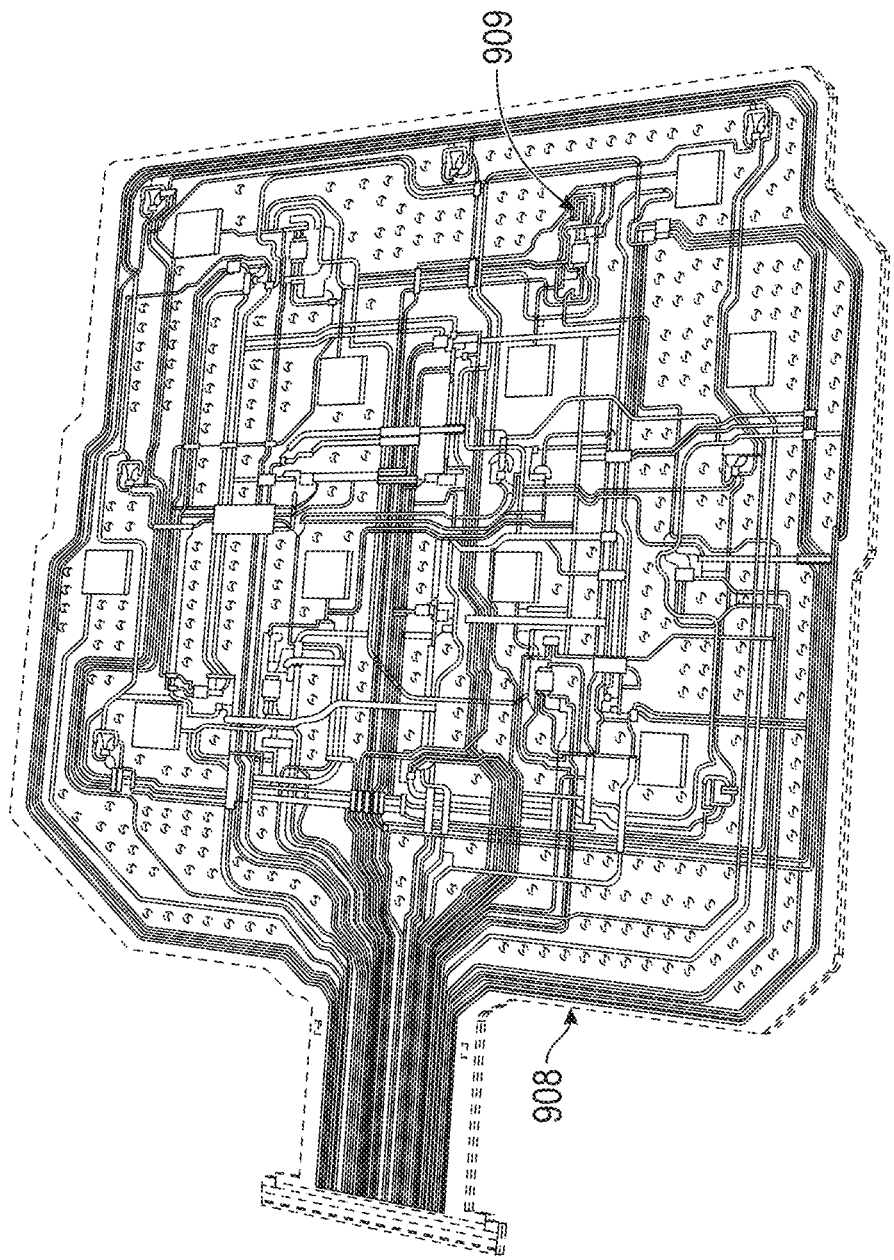
FIG. 11 illustrates a dressing with adhesive for application of an additional dressing layer.

The dressing can include a wicking layer on the side of the dressing opposite the protective liner as shown in FIGS. 2A-2B. As shown in FIG. 4, the wicking layer can be applied 409 to the second side of the substrate. The wicking layer can be a foam wicking layer. Any carrier liner applied to the surface of the second side of the substrate can be removed. A wicking material can be cut to the size of the substrate or approximately the size of the substrate. As shown in FIG. 11, a thin layer of adhesive 908 can be spread or applied around the periphery of the sample. Additionally, several spots of adhesive 909 can be spread across the non-perforated sections of the substrate as shown in FIG. 11. The wicking layer can be positioned on top of the adhesive such that the entire second side of the substrate is covered by the wicking layer material. The substrate can then be exposed to UV light or other wavelengths of light to cure the adhesive. The substrate, substrate coating, wound contact layer, and protective liner material can be transparent, translucent, or otherwise optically clear to allow UV light or other wavelengths of light to penetrate or pass through and cure the adhesive between the substrate and the wicking layer material.

As described with reference to FIG. 2A, the second side of the substrate can be in direct contact with the wicking layer material. In other cases, as described with reference to FIG. 2B, the second side of the substrate can be coated with a coating material (for example, the soft coat material). In such cases, the wicking layer material can be applied on the coating of the second side of the substrate.

OTHER VARIATIONS

In some cases, one or more electronic components can be positioned on the side of a substrate opposite the side that faces the wound. Systems and methods described herein are equally applicable to such wound contact layers. Although certain embodiments described herein relate to wound dressings, systems and methods disclosed herein are not limited to wound dressings or medical applications. Systems and methods disclosed herein are generally applicable to electronic devices in general, such as electronic devices that can be worn by or applied to a user.

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value. Moreover, although blocks of the various processes may be described in terms of determining whether a value meets or does not meet a particular threshold, the blocks can be similarly understood, for example, in terms of a value (i) being below or above a threshold or (ii) satisfying or not satisfying a threshold.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated or disclosed may differ from those shown in the figures. Depending on the embodiment, certain of the steps described above may be removed, others may be added. For example, the actual steps or order of steps taken in the disclosed processes may differ from those shown in the figure. Depending on the embodiment, certain of the steps described above may be removed, others may be added. For instance, the various components illustrated in the figures may be implemented as software or firmware on a processor, controller, ASIC, FPGA, or dedicated hardware. Hardware components, such as controllers, processors, ASICs, FPGAs, and the like, can include logic circuitry. Furthermore, the features and attributes of the specific embodiments disclosed above may be combined in different ways to form additional embodiments, all of which fall within the scope of the present disclosure.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method of manufacturing a wound dressing comprising:

coating a first, wound-facing side of a flexible substrate with a first coating, the substrate comprising a second side opposite the first side, the first side of the substrate supporting a plurality of electronic components and a plurality of electronic connections, wherein the first coating is applied to at least one of one or more electronic components of the plurality of electronic components or one or more electronic connections of the plurality of electronic connections and not to at least some regions of the first side of the substrate that do not include electronic components or electronic connections;

coating the first side of the substrate with a second coating including the at least some regions of the first side of the substrate that do not include electronic components or electronic connections, wherein the second coating is applied over the first coating;

adhering a wound contact layer to the first side and in contact with the second coating, the wound contact layer configured to contact a wound;

then perforating the wound contact layer and the substrate coated with the first and second coating together to create a plurality of through holes through the wound contact layer and the substrate coated with the first and second coating, the plurality of through holes configured to facilitate passage of fluid through the wound contact layer and the substrate;

adhering a protective layer to the wound contact layer, the protective layer configured to be removed to expose the wound contact layer; and adhering a wicking layer to the second side of the substrate, the wicking layer configured to facilitate passage of fluid.

2. The method of claim 1, further comprising, prior to adhering the wicking layer to the second side of the substrate, coating the second side with the second coating.

3. The method of claim 1, further comprising positioning holes in the wound contact layer over areas of the substrate that support the plurality of electronic components when the wound contact layer is adhered to the second coating.

4. The method of claim 1, wherein the plurality of electronic components comprise a plurality of sensors configured to obtain measurements of a wound, at least some of the plurality of sensors being interconnected by at least some electronic connections of the plurality of electronic connections.

5. The method of claim 1, wherein the second coating covers an entire area of the first side of the substrate.

6. The method of claim 1, wherein the wicking layer comprises foam.

7. The method of claim 1, wherein the protective layer comprises first and second portions separated by a slit, the first portion extending over the second portion to cover the slit.

8. The method of claim 1, wherein the protective layer comprises a handle.

9. The method of claim 1, wherein the through holes are perforated through the substrate, the first coating, and the second coating at the same position.

10. The method of claim 1, wherein at least one of the first coating or the second coating comprises a conformal coating.

11. A method of manufacturing a wound dressing comprising:

coating a first, wound-facing side of a flexible substrate with a first coating, the substrate comprising a second side opposite the first side, the first side of the substrate supporting a plurality of electronic components and a plurality of electronic connections, wherein the first coating is applied to at least one of one or more electronic components of the plurality of electronic components or one or more electronic connections of the plurality of electronic connections and not to at least some regions of the first side of the substrate that do not include electronic components or electronic connections;

coating the first side of the substrate including the at least some regions of the first side of the substrate that do not include electronic components or electronic connections with a second coating, wherein the second coating is applied over the first coating;

perforating the substrate coated with the first and second coating together to create a plurality of aligned through holes through the substrate coated with the first and second coating, the plurality of aligned through holes configured to facilitate passage of fluid through the substrate, the first coating, and the second coating; and adhering a protective layer to the substrate, the protective layer configured to be removed to expose the first side of the substrate.

12. The method of claim 11, wherein the step of perforating the substrate coated with the first and second coating to create a plurality of through holes through the substrate coated with the first and second coating is performed after coating the first side with the first coating and after coating the first side with the second coating.

13. The method of claim 11, wherein at least one of the first coating or the second coating comprises a conformal coating.

\* \* \* \* \*